United States Patent
Okubo et al.

(10) Patent No.: US 10,647,075 B2
(45) Date of Patent: May 12, 2020

(54) FRICTION TRANSMISSION BELT AND MANUFACTURING METHOD THEREFOR

(71) Applicant: BANDO CHEMICAL INDUSTRIES, LTD., Kobe-shi, Hyogo (JP)

(72) Inventors: Takayuki Okubo, Kobe (JP); Hisashi Matsuda, Kobe (JP); Hideaki Kawahara, Kobe (JP); Shinji Takahashi, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 19 days.

(21) Appl. No.: 16/041,616

(22) Filed: Jul. 20, 2018

(65) Prior Publication Data

US 2018/0326680 A1 Nov. 15, 2018

Related U.S. Application Data

(63) Continuation of application No. PCT/JP2017/000130, filed on Jan. 5, 2017.

(30) Foreign Application Priority Data

Jan. 22, 2016 (JP) .................. 2016-011033
Mar. 23, 2016 (JP) .................. 2016-059188

(51) Int. Cl.
*B29D 29/08* (2006.01)
*B29D 29/10* (2006.01)
*F16G 1/12* (2006.01)
*F16G 5/20* (2006.01)
*F16G 5/08* (2006.01)
*F16G 1/10* (2006.01)
*F16G 5/10* (2006.01)
*F16G 5/16* (2006.01)

(52) U.S. Cl.
CPC ........... *B29D 29/08* (2013.01); *B29D 29/103* (2013.01); *F16G 1/10* (2013.01); *F16G 1/12* (2013.01); *F16G 5/08* (2013.01); *F16G 5/10* (2013.01); *F16G 5/20* (2013.01); *F16G 5/166* (2013.01)

(58) Field of Classification Search
CPC ........................................................ F16G 1/06
See application file for complete search history.

(56) References Cited

U.S. PATENT DOCUMENTS

| 6,028,143 | A | 2/2000 | Mukai | |
|---|---|---|---|---|
| 2005/0113200 | A1* | 5/2005 | Okuno | F16G 1/28 474/266 |
| 2008/0207371 | A1 | 8/2008 | Dieudonne et al. | |
| 2009/0264236 | A1 | 10/2009 | Omori et al. | |
| 2013/0237354 | A1* | 9/2013 | Shiriike | F16G 5/06 474/148 |

FOREIGN PATENT DOCUMENTS

| JP | 63-277255 A | 11/1988 |
|---|---|---|
| JP | H10-067886 A | 3/1998 |
| JP | 2007-070592 A | 3/2007 |
| JP | 2007-170454 A | 7/2007 |
| JP | 2007-170587 A | 7/2007 |
| JP | 2007-255635 A | 10/2007 |
| JP | 2007-270917 A | 10/2007 |
| JP | 2009-533606 A | 9/2009 |
| JP | 2011-102641 A | 5/2011 |
| JP | 2013-113343 A | 6/2013 |

* cited by examiner

*Primary Examiner* — Wenwen Cai
(74) *Attorney, Agent, or Firm* — Knobbe, Martens, Olson & Bear, LLP

(57) ABSTRACT

A friction transmission belt has a rubber layer forming a pulley contacting portion. The rubber layer is made of a rubber composition containing a crosslinked rubber component and crosslinked polyolefin particles. Examples of the crosslinked polyolefin particles can contain ultrahigh molecular weight polyolefin particles having an average molecular weight of 500,000 or more.

13 Claims, 30 Drawing Sheets

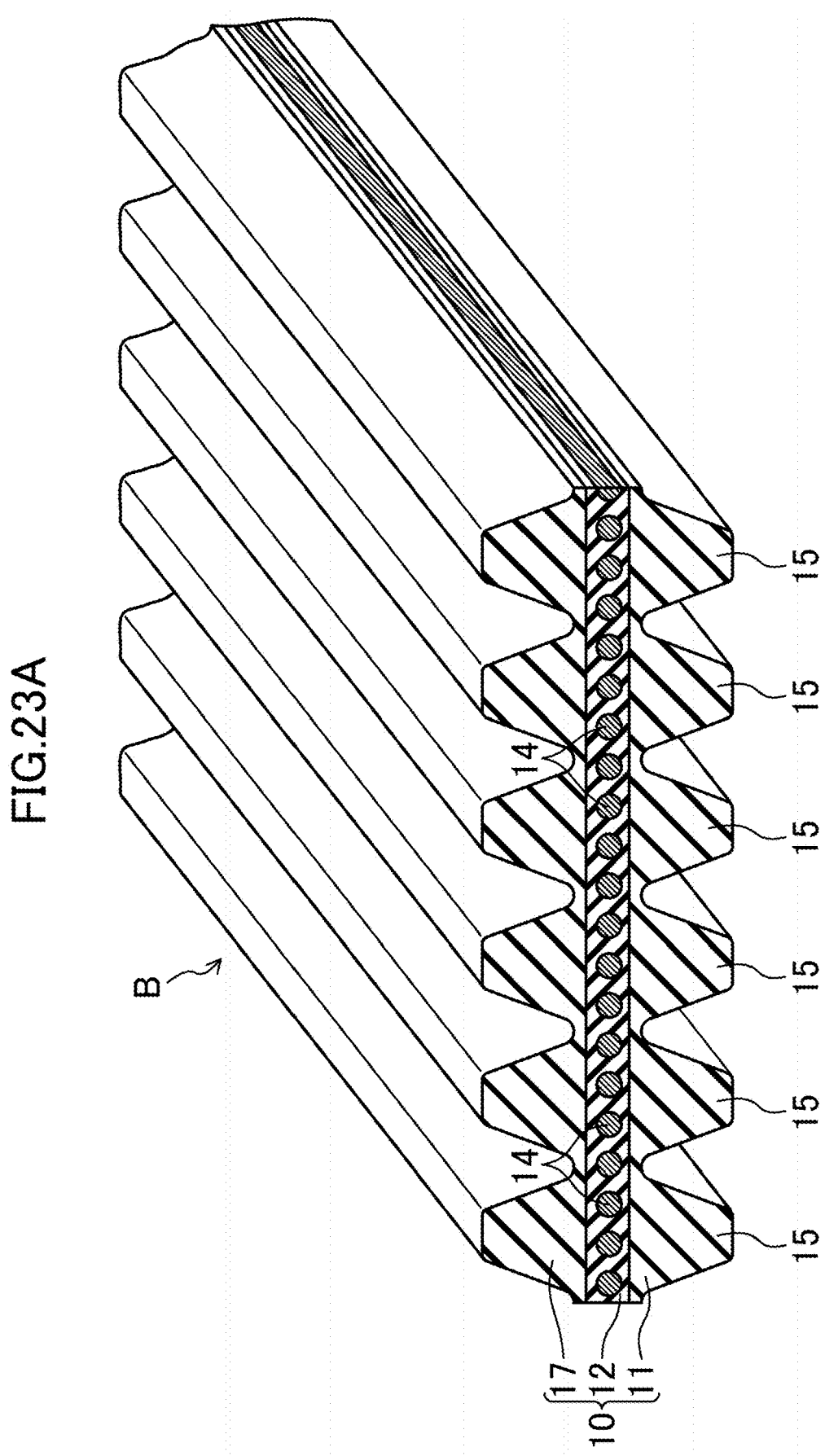

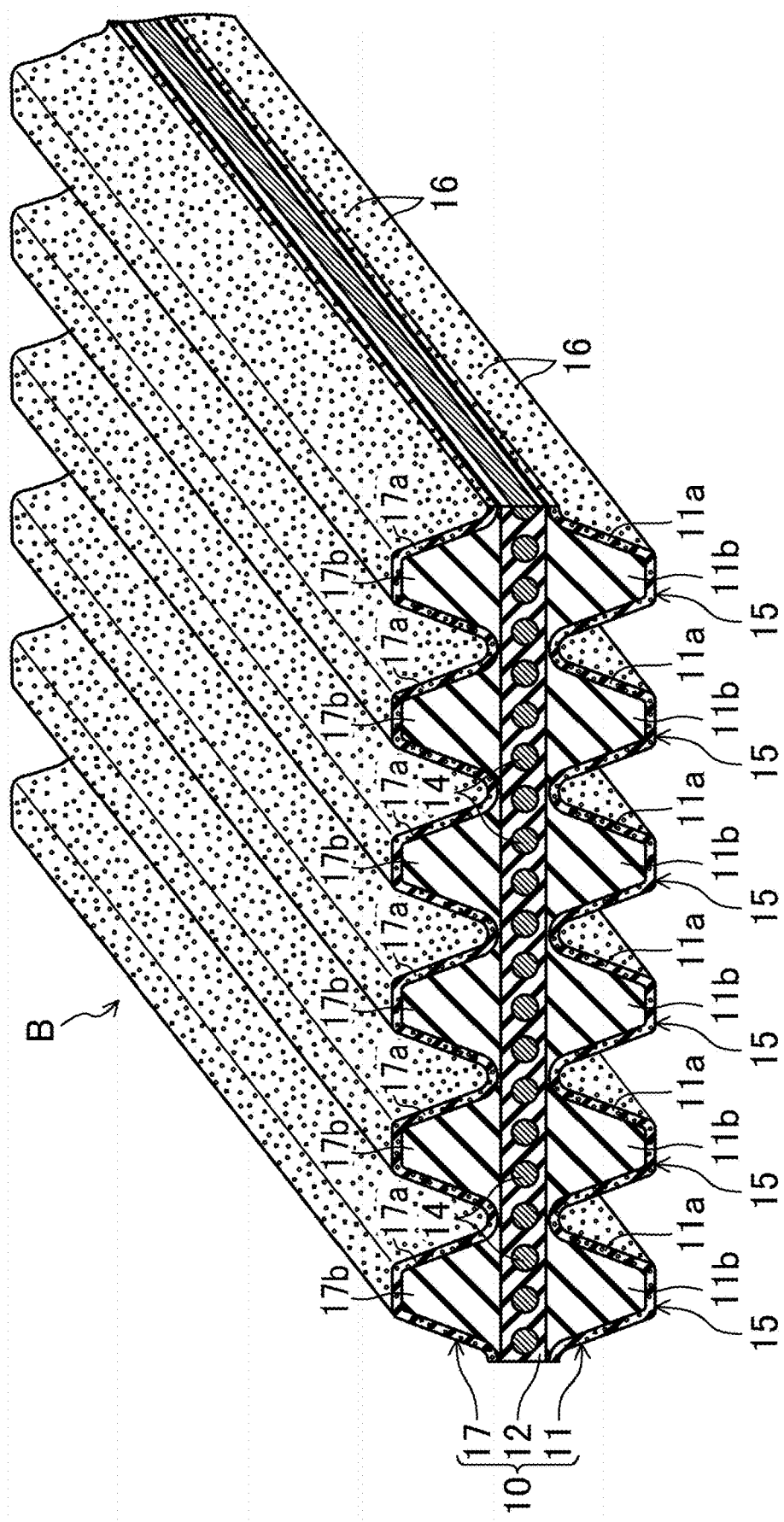

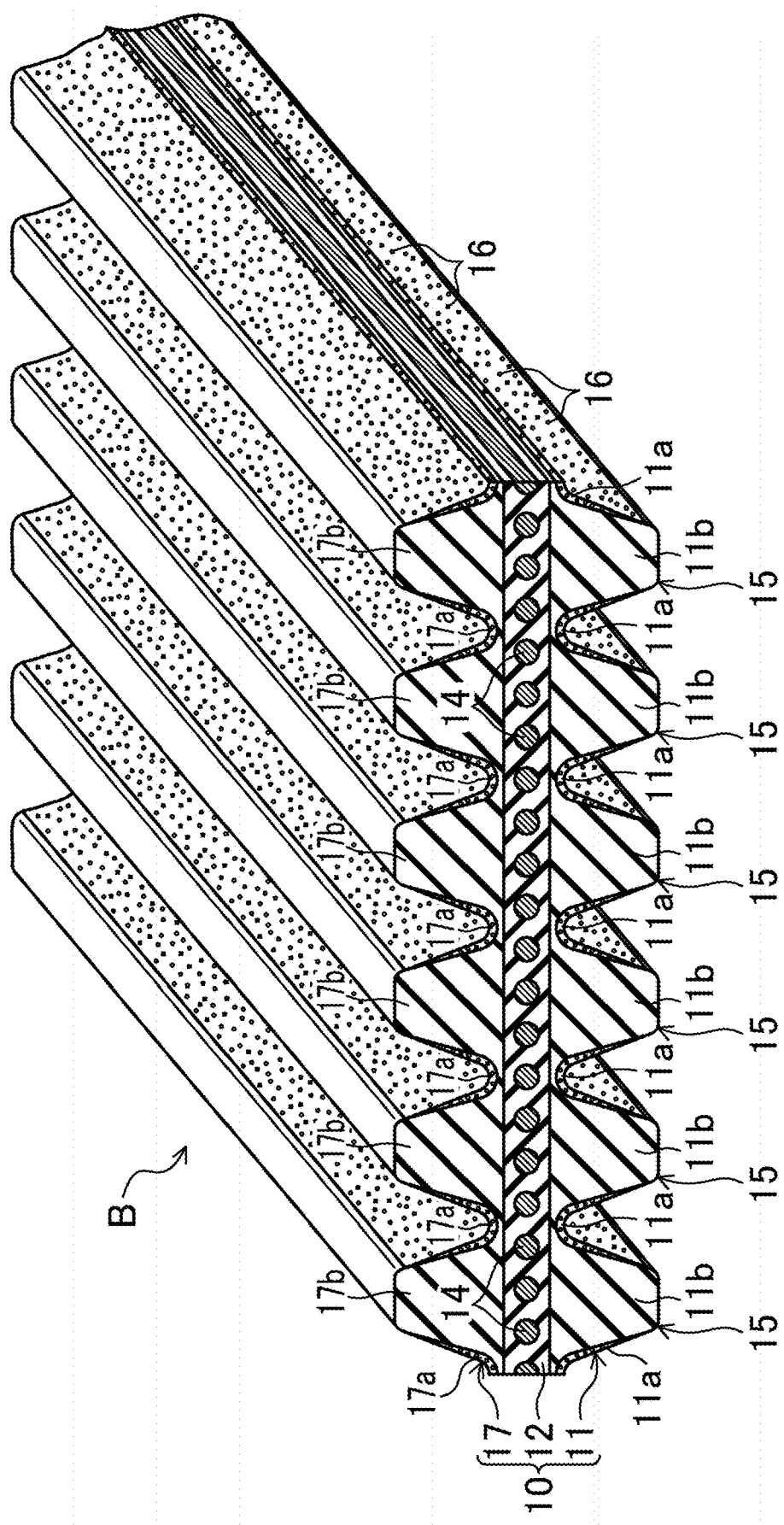

FRICTION TRANSMISSION BELT AND MANUFACTURING METHOD THEREFOR

CROSS-REFERENCE TO RELATED APPLICATIONS

This is a continuation of International Application No. PCT/JP2017/000130 filed on Jan. 5, 2017, which claims priority to Japanese Patent Application No. 2016-011033 filed on Jan. 22, 2016 and Japanese Patent Application No. 2016-059188 filed on Mar. 23, 2016. The entire disclosures of these applications are incorporated by reference herein.

BACKGROUND

The present invention relates to a friction transmission belt and a method for forming the friction transmission belt.

For the purpose of improving wear resistance, it is known to produce a friction transmission belt in which a rubber layer forming a pulley contacting portion is made of a rubber composition containing ultrahigh molecular weight polyethylene particles. For example, Japanese Unexamined Patent Publication No. 2007-070592, Japanese Unexamined Patent Publication No. 2007-170454, and Japanese Unexamined Patent Publication No. 2007-170587 disclose a V-ribbed belt, a compressed rubber layer of which is made of a rubber composition containing ultrahigh molecular weight polyethylene particles.

SUMMARY

The present invention is a friction transmission belt having a rubber layer forming a pulley contacting portion, wherein the rubber layer is made of a rubber composition containing a crosslinked rubber component and crosslinked polyolefin particles.

The present invention is a method for forming a friction transmission belt having a rubber layer forming a pulley contacting portion, wherein the rubber layer is made of a rubber composition produced by heating and pressing an uncrosslinked rubber composition prepared by mixing a rubber component and crosslinked polyolefin particles, and thereby crosslinking the rubber component.

BRIEF DESCRIPTION OF THE DRAWINGS

FIG. 23A is a perspective view of a double-sided V-ribbed belt piece according to another embodiment corresponding to the first embodiment.

FIG. 23C is a perspective view of a double-sided V-ribbed belt piece according to another embodiment corresponding to the third embodiment.

FIG. 23D is a perspective view of a double-sided V-ribbed belt piece according to another embodiment corresponding to the fourth embodiment.

DETAILED DESCRIPTION

Embodiments will be described in detail below, based on the drawings.

First Embodiment

Figure 1:
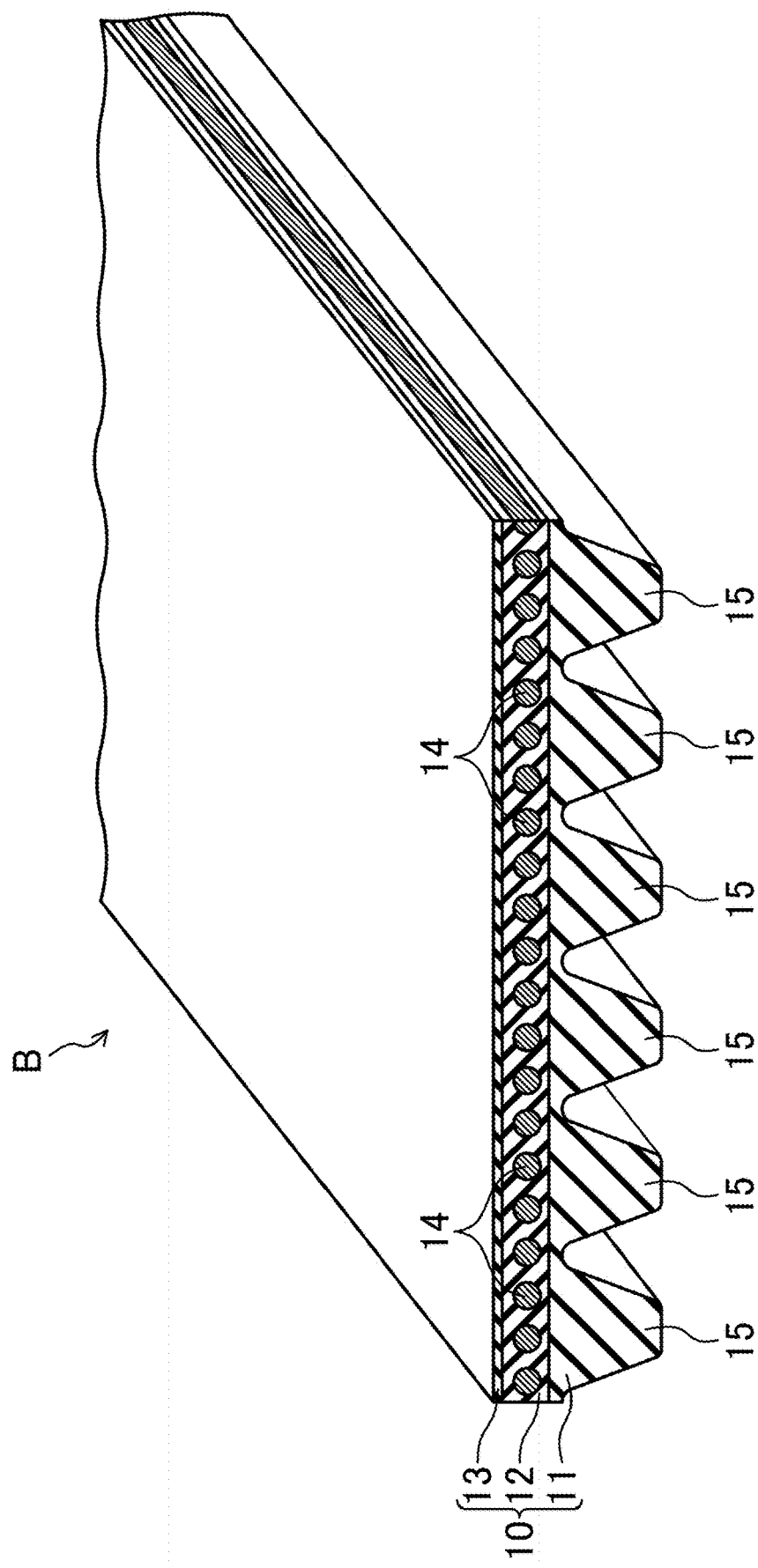
FIG. 1 illustrates a perspective view of a V-ribbed belt piece according to a first embodiment.
Figure 2:
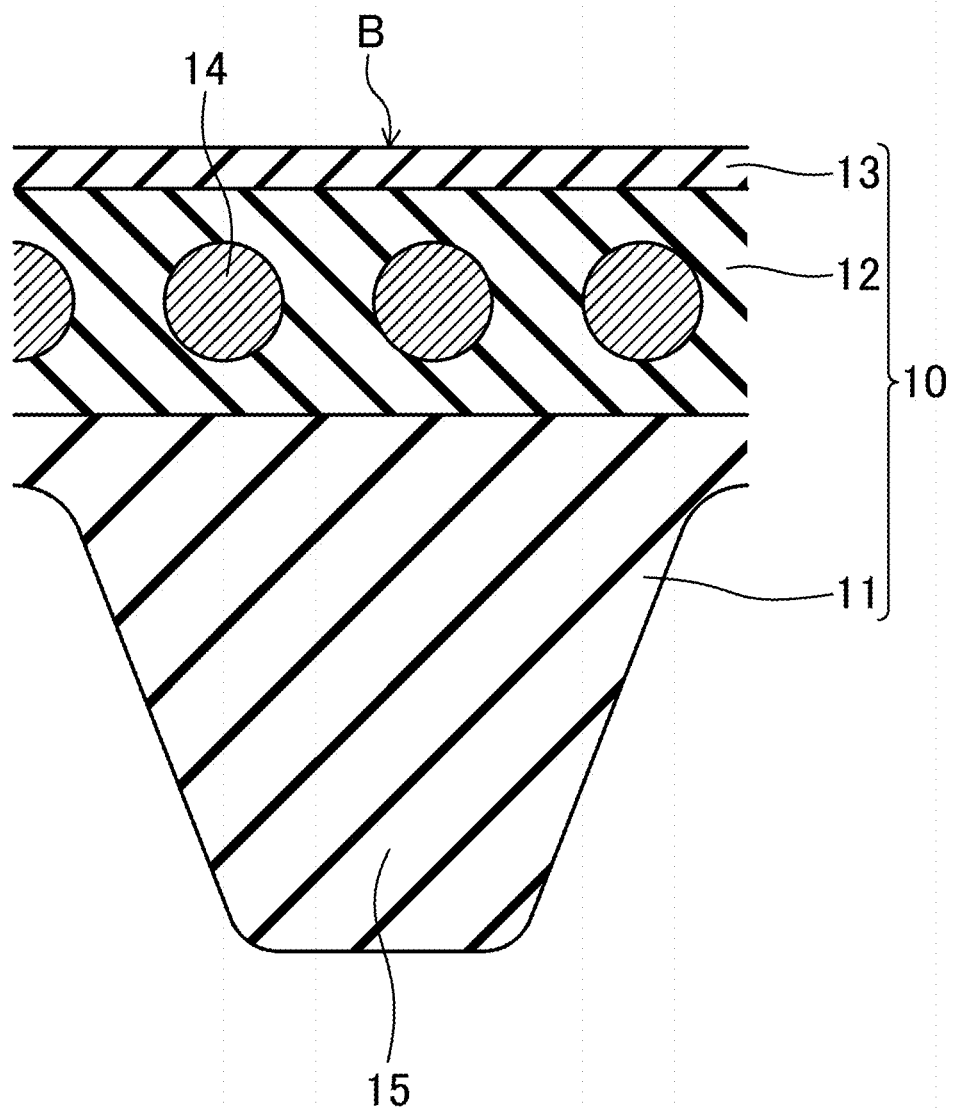
FIG. 2 illustrates a cross-sectional view of a single V-shaped rib of the V-ribbed belt according to the first embodiment.

FIGS. 1 and 2 illustrate a V-ribbed belt B (a friction transmission belt) according to a first embodiment. The V-ribbed belt B of the first embodiment is, for example, an endless belt used in a belt transmission system for driving an accessory provided in an engine compartment of an automobile. The V-ribbed belt B of the first embodiment has a length ranging from 700 mm to 3000 mm, a width ranging from 10 mm to 36 mm, and a thickness ranging from 4.0 mm to 5.0 mm, for example.

The V-ribbed belt B of the first embodiment has a three-layered V-ribbed belt body 10 which includes a compressed rubber layer 11 forming a pulley contacting portion and constituting an inner side portion of the belt, an adhesive rubber layer 12 constituting an intermediate portion of the belt, and a backface rubber layer 13 constituting an outer side portion of the belt. A cord 14 is embedded in a middle portion, in the belt thickness direction, of the adhesive rubber layer 12 of the V-ribbed belt body 10, such that the cord 14 forms a helical pattern having a pitch in the belt width direction. The compressed rubber layer 11 has a thickness ranging from 1.0 mm to 3.6 mm, for example. The adhesive rubber layer 12 has a thickness ranging from 1.0 mm to 2.5 mm, for example. The backface rubber layer 13 has a thickness ranging from 0.4 mm to 0.8 mm, for example. The backface rubber layer 13 may be replaced with a backface reinforcing fabric.

The compressed rubber layer 11 includes a plurality of V-shaped ribs 15 protruding from the inner side of the belt. The plurality of V-shaped ribs 15 are each in the shape of a rib extending in the longitudinal direction of the belt and having an approximately inverted triangular cross-section. The V-shaped ribs 15 are arranged parallel to one another in the width direction of the belt. Each of the V-shaped ribs 15 has, for example, a height ranging from 2.0 mm to 3.0 mm, and a width ranging from 1.0 mm to 3.6 mm at a proximal end. The number of the V-shaped ribs is three or more and six or less (six ribs in FIG. 1), for example.

The compressed rubber layer 11 is made of a rubber composition produced from an uncrosslinked rubber composition prepared by kneading a rubber component with various compound ingredients, including crosslinked polyolefin particles, mixed therein. This uncrosslinked rubber composition is heated and pressed, so that the rubber component is crosslinked. The thus obtained rubber composition is used for the compressed rubber layer 11. Thus, the rubber composition forming the compressed rubber layer 11 contains the crosslinked rubber component and various compound ingredients, including crosslinked polyolefin particles, which are dispersed in the rubber component. The V-ribbed belt B according to the first embodiment exhibits significantly high wear resistance as shown in Examples, which will be described later, because the compressed rubber layer 11 forming the pulley contacting portion is formed of the rubber composition containing the crosslinked polyolefin particles. In the following description, polyolefin particles which are crosslinked are referred to as "crosslinked polyolefin particles," and polyolefin particles which are not crosslinked are referred to as "uncrosslinked polyolefin particles."

Examples of the rubber component of the rubber composition which forms the compressed rubber layer 11 include: an ethylene-α-olefin elastomer, such as an ethylene-propylene-diene terpolymer (hereinafter referred to as "EPDM"), ethylene-propylene copolymer (EPM), ethylene-butene copolymer (EDM), and ethylene-octene copolymer (EOM); chloroprene rubber (CR); chlorosulfonated polyethylene rubber (CSM); and hydrogenated acrylonitrile rubber (H-NBR). One kind or a blend of two or more kinds of these substances is suitable as the rubber component. An ethylene-α-olefin elastomer is suitable as the rubber component. EPDM is more suitable as the rubber component.

Examples of the polyolefin constituting the crosslinked polyolefin particles include homopolymers such as polyethylene, polypropylene, poly-1-butene and poly-4-methyl-1-pentene, and copolymers of ethylene and α-olefin, such as propylene, 1-butene, 1-hexene, 1-octene, 4-methyl-1-pentene. As the crosslinked polyolefin particles, it is suitable to use one or two kinds of these substances, and more suitably to use particles of homopolymer polyethylene. The crosslinked polyolefin particles suitably contain crosslinked polyethylene particles, more suitably contain crosslinked polyethylene particles as a main part thereof, and more suitably contain only crosslinked polyethylene particles.

In order to increase the wear resistance of the compressed rubber layer 11 forming the pulley contacting portion, the crosslinked polyolefin particles suitably contain crosslinked ultrahigh molecular weight polyolefin particles having an average molecular weight (i.e., weight average molecular weight, number average molecular weight) of 500,000 or more, more suitably contain crosslinked ultrahigh molecular weight polyolefin particles having an average molecular weight of 500,000 or more as a main part thereof, and still more suitably contain only crosslinked ultrahigh molecular weight polyolefin particles having an average molecular weight of 500,000 or more. The average molecular weight (i.e., the weight average molecular weight, the number average molecular weight) of the ultrahigh molecular weight polyolefin particles is suitably 1,000,000 or more, more suitably 1,800,000 or more, and still more suitably 2,000,000 or more, and in order to increase flex fatigue resistance, suitably 6,000,000 or less, more suitably 3,500,000 or less, and still more suitably 3,000,000 or less. Examples of the ultrahigh molecular weight polyolefin particles include ultrahigh molecular weight polyethylene particles.

In order to increase the wear resistance of the compressed rubber layer 11 forming the pulley contacting portion, the average particle diameter of the crosslinked polyolefin particles is suitably 10 μm or more and more suitably 100 μm or more, and in order to increase the flex fatigue resistance, suitably 200 μm or less, more suitably 170 μm or less, and still more suitably 150 μm or less. The average particle diameter is obtained by the arithmetic average of the diameters (i.e., the maximum outer diameters) of 50 to 100 particles, both inclusive, actually measured from an observation picture of the crosslinked polyolefin particles taken by a scanning electron microscope in consideration of a magnification.

In order to increase the wear resistance of the compressed rubber layer 11 forming the pulley contacting portion, the particle size distribution of the crosslinked polyolefin particles is such that suitably 70% by mass or more, more suitably 80% by mass or more, and still more suitably 90% by mass or more of the crosslinked polyolefin particles is in the particle diameter range of from 100 μm to 150 μm, both inclusive.

In order to increase the wear resistance of the compressed rubber layer 11 forming the pulley contacting portion, the crosslinked polyolefin particles each have an approximately sphere shape, and the aspect ratio obtained by dividing maximum outer diameters of the crosslinked polyolefin particles by minimum outer diameters thereof is suitably 2.00 or less, more suitably 1.50 or less, and still more suitably 1.30 or less. The aspect ratio is obtained by the arithmetic average of diameters obtained by dividing maximum outer diameters of 50 to 100 particles, both inclusive, by minimum outer diameters, actually measured from an observation picture of the crosslinked polyolefin particles taken by a scanning electron microscope in consideration of a magnification. If the state of the crosslinked polyolefin particles before mixture is such that spherical particles each having a diameter of 10 μm or more and 50 μm or less coagulate like clusters, it is suitable that the spherical particles are fused, and hence combined, by the heat applied during formation of the belt, and formed into a spherical or ellipsoidal shape.

In order to increase the wear resistance of the compressed rubber layer 11 forming the pulley contacting portion, the limiting viscosity [η] of the crosslinked polyolefin particles measured in decalin at 135° C. is suitably 5 dl/g or more, and in order to increase the flex fatigue resistance, suitably 50 dl/g or less and more suitably 30 dl/g or less.

In order to increase the wear resistance of the compressed rubber layer 11 forming the pulley contacting portion, the melting point of the crosslinked polyolefin particles is suitably 125° C. or more and more suitably 130° C. or more, and suitably 145° C. or less. The melting point is determined by differential scanning calorimetry (DSC).

In order to increase the wear resistance of the compressed rubber layer 11 forming the pulley contacting portion, the content of the crosslinked polyolefin particles in the rubber composition forming the compressed rubber layer 11 is suitably 20 parts by mass or more, more suitably 50 parts by mass or more, and still more suitably 70 parts by mass or more, and in order to increase the flex fatigue resistance, suitably 100 parts by mass or less and more suitably 90 parts by mass or less, with respect to 100 parts by mass of the rubber component.

The crosslinked polyolefin particles can be prepared by irradiating the uncrosslinked polyolefin particles with radiation. In this case, irradiation of the uncrosslinked polyolefin particles with radiation causes cleavage and crosslinking of molecular chains of polyolefin. As a result, the molecular chains are bonded at the crosslinking point. The radiation causes the particle to undergo crosslinking, which proceeds outward from a central portion of the particle. Examples of the radiation include α ray, β ray, γ ray, electron ray, and ions, but electron ray or γ ray is suitable. The irradiation dose is suitably 50 kGy or more and more suitably 100 kGy or more, and suitably 700 kGy or less and more suitably 500 kGy or less.

The crosslinked polyolefin particles suitably contain crosslinked polyolefin hollow particles having a hollow portion inside. The crosslinked polyolefin hollow particles contained in the crosslinked polyolefin particles dispersed in the compressed rubber layer 11 forming the pulley contacting portion contribute to reducing the decline in power transmission capability due to slips when the belt is wet. This may be because of the drain effect of hollow portions of the crosslinked polyolefin hollow particles exposed on the surface of the compressed rubber layer 11 forming the pulley contacting portion, and the driving effect caused by edges of the hollow portions engaging with the pulley. It is suitable that the content of the crosslinked polyolefin hollow particles in the crosslinked polyolefin particles is greater than the content of crosslinked polyolefin solid particles, which are solid inside, in the crosslinked polyolefin particles. Crosslinked polyolefin hollow particles can be obtained by sufficiently irradiating uncrosslinked polyolefin particles with radiation.

The rubber composition forming the compressed rubber layer 11 may further contain uncrosslinked polyolefin particles, which are not crosslinked, in addition to the crosslinked polyolefin particles. In order to increase the wear resistance of the compressed rubber layer 11 forming the pulley contacting portion, the total content of the crosslinked polyolefin particles and the uncrosslinked polyolefin particles in the rubber composition forming the compressed rubber layer 11 is suitably 20 parts by mass or more, more suitably 50 parts by mass or more, and still more suitably 70 parts by mass or more, and in order to increase the flex fatigue resistance, suitably 100 parts by mass or less and more suitably 90 parts by mass or less, with respect to 100 parts by mass of the rubber component. It is suitable that the content of the crosslinked polyolefin particles in the rubber composition forming the compressed rubber layer 11 is greater than the content of the uncrosslinked polyolefin particles in the rubber composition forming the compressed rubber layer 11. The uncrosslinked polyolefin particles may contain uncrosslinked polyolefin hollow particles having a hollow portion inside. It is suitable that the content of the uncrosslinked polyolefin hollow particles in the uncrosslinked polyolefin particles is less than the content of uncrosslinked polyolefin solid particles, which are solid inside, in the uncrosslinked polyolefin particles. It is more suitable that all of the uncrosslinked polyolefin particles are uncrosslinked polyolefin solid particles.

Examples of the compound ingredients include a reinforcing material such as carbon black, a filler, a processing aid, a vulcanization aid, a crosslinking agent, and a co-crosslinking agent.

Examples of carbon blacks used as the reinforcing material include: channel black; furnace black such as SAF, ISAF, N-339, HAF, N-351, MAF, FEF, SRF, GPF, ECF, and N-234; thermal black such as FT and MT; and acetylene black. Silica may also be used as the reinforcing material. Suitably, the reinforcing material is comprised of one kind or two or more kinds of these substances. The content of the reinforcing material with respect to 100 parts by mass of the rubber component is suitably 30 parts by mass or more and 60 parts by mass or less.

Examples of the filler include calcium carbonate and layered silicate. Suitably, the filler is comprised of any one or both of these substances. The content of the filler with respect to 100 parts by mass of the rubber component is suitably 10 parts by mass or more and 60 parts by mass or less.

Examples of the layered silicate as the filler include smectite family, vermiculite family, and kaolin family. Examples of the smectite family include montmorillonite, beidellite, saponite, and hectorite. Examples of the vermiculite family include trioctahedral vermiculite, and dioctahedral vermiculite. Examples of the kaolin family include kaolinite, dickite, halloysite, lizardite, amesite, and chrysotile. Suitably, the layered silicate is comprised of one kind or two or more kinds of these substances. The content of the layered silicate in the rubber composition forming the compressed rubber layer 11 with respect to 100 parts by mass of the rubber component is suitably 10 parts by mass or more and 50 parts by mass or less.

Examples of the processing aid include a stearic acid, polyethylene wax, and a metal salt of fatty acid. Suitably, the processing aid is comprised of one kind or two or more kinds of these substances. The content of the processing aid in the rubber composition forming the compressed rubber layer 11 with respect to 100 parts by mass of the rubber component is suitably 0.1 parts by mass or more and 3 parts by mass or less.

Examples of the vulcanization aid include metal oxides such as zinc oxide (zinc white) and magnesium oxide. Suitably, the vulcanization aid is comprised of one kind or two or more kinds of these substances. The content of the vulcanization aid with respect to 100 parts by mass of the rubber component is 1 part by mass or more and 10 parts by mass or less, for example.

Examples of the crosslinking agent include an organic peroxide and sulfur. The organic peroxide alone, sulfur alone, or even a combination of these substances may be used as the crosslinking agent. The content of the organic peroxide as the crosslinking agent with respect to 100 parts by mass of the rubber component is 0.5 parts by mass or more and 8 parts by mass or less, for example. The content of sulfur as the crosslinking agent with respect to 100 parts by mass of the rubber component is 0.5 parts by mass or more and 4 parts by mass or less, for example.

Examples of the co-crosslinking agent include trimethylolpropane trimethacrylate, ethylene glycol dimethacrylate, triallyl isocyanurate, liquid polybutadiene, and N, N'-m-phenylene bismaleimide. Suitably, the co-crosslinking agent is comprised of one kind or two or more kinds of these substances. The content of the co-crosslinking agent in the rubber composition forming the compressed rubber layer 11 with respect to 100 parts by mass of the rubber component is suitably 0.5 parts by mass or more and 7 parts by mass or less.

The rubber composition forming the compressed rubber layer 11 may contain short fibers unless the effect of improving the wear resistance is impaired, but it is suitable that substantially no short fiber is contained in the rubber composition.

The adhesive rubber layer 12 is in the shape of a strip having a horizontally elongated rectangular cross-section. The backface rubber layer 13, too, is in the shape of a strip having a horizontally elongated rectangular cross-section. Suitably, a surface of the backface rubber layer 13 has a weave pattern transferred from woven fabric in order to reduce sounds generated between the backface rubber layer 13 and a flat pulley in contact with the backface rubber layer 13.

The adhesive rubber layer 12 and the backface rubber layer 13 are each made of a rubber composition produced by heating and pressing an uncrosslinked rubber composition prepared by kneading a rubber component blended with various ingredients, and crosslinking the kneaded product by a crosslinking agent. Thus, each of the adhesive rubber layer 12 and the backface rubber layer 13 contains the crosslinked rubber component and various compound ingredients. In order to reduce sticking between the backface rubber layer 13 and the flat pulley in contact with the backface rubber layer 13, the backface rubber layer 13 is suitably made of a rubber composition which is slightly harder than the rubber composition of the adhesive rubber layer 12.

Examples of the rubber components of the rubber compositions that make the adhesive rubber layer 12 and the backface rubber layer 13 include ethylene-α-olefin elastomer, chloroprene rubber (CR), chlorosulfonated polyethylene rubber (CSM), and hydrogenated acrylonitrile-butadiene rubber (H-NBR), but are suitably the same as the rubber component of the compressed rubber layer 11.

Similarly to the compressed rubber layer 11, examples of the compound ingredients include a reinforcing material such as carbon black, a filler, a processing aid, a vulcanization aid, a crosslinking agent, and a co-crosslinking agent.

The rubber compositions that make the compressed rubber layer 11, the adhesive rubber layer 12, and the backface rubber layer 13 may be the same as one another or different from one another.

The cord 14 is made of twist yarn of fibers, such as polyester fibers (PET), polyethylene naphthalate fibers (PEN), aramid fibers, and vinylon fibers. The diameter of the cord 14 is, for example, 0.50 mm to 2.5 mm, both inclusive. The distance between the centers of the cord 14 which are adjacent to each other in a cross-section is, for example, 0.050 mm to 0.20 mm, both inclusive. The cord 14 undergoes, prior to the molding of the belt, an adhesion treatment in which the cord 14 is soaked in an RFL aqueous solution and then heated and/or an adhesion treatment in which the cord 14 is soaked in rubber cement and then dried, to provide adhesiveness to the adhesive rubber layer 12 of the V-ribbed belt body 10.

Now, a method for fabricating the V-ribbed belt B according to the first embodiment will be described.

Figure 3:
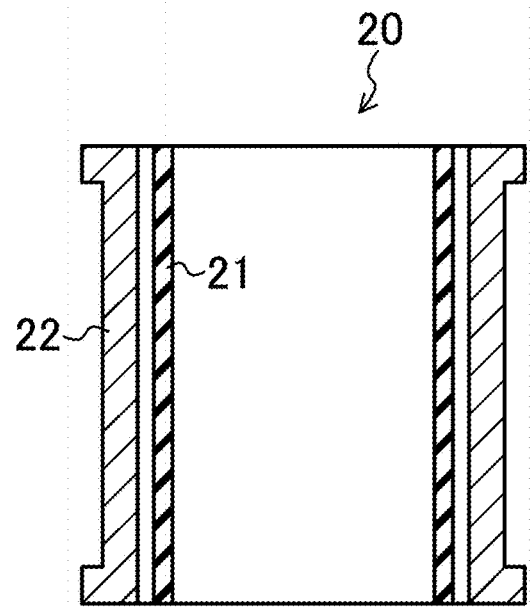
FIG. 3 illustrates a longitudinal cross-sectional view of a belt forming mold.
Figure 4:
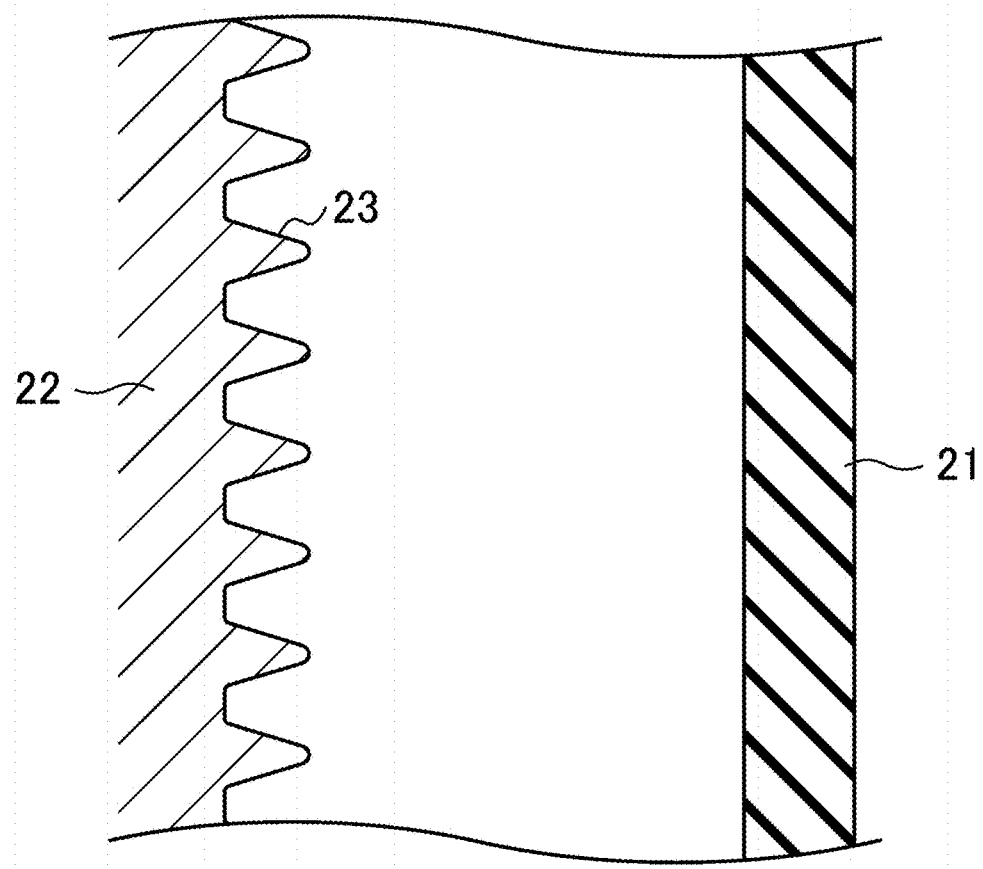
FIG. 4 illustrates an enlarged longitudinal cross-sectional view of a portion of the belt forming mold.

In fabricating the V-ribbed belt B of the first embodiment, a belt forming mold 20 comprised of a cylindrical inner mold 21 and a cylindrical outer mold 22 which are concentric with each other as shown in FIGS. 3 and 4, is used.

The inner mold 21 of the belt forming mold 20 is made of a flexible material, such as rubber. The outer mold 22 is made of a rigid material, such as metal. The inner circumferential surface of the outer mold 22 serves as a molding surface, and has V-shaped rib formation grooves 23 arranged at regular pitches in an axial direction. The outer mold 22 is provided with a temperature control mechanism which allows a heating medium, such as water vapor, or a cooling medium, such as water, to flow and control temperature. The belt forming mold 20 is provided with a pressurizing means configured to pressurize and expand the inner mold 21 from inside.

In the fabrication of the V-ribbed belt B of the first embodiment, compound ingredients are added to a rubber component, and the mixture is kneaded by a mixer, such as a kneader and a Banbury mixer. The resultant uncrosslinked rubber composition is shaped into a sheet by calendering, for example, to form an uncrosslinked rubber sheet 11' for making a compressed rubber layer 11. Crosslinked polyolefin particles are added to the uncrosslinked rubber sheet 11' for making the compressed rubber layer 11. The crosslinked polyolefin particles can be prepared in advance by, for example, irradiating uncrosslinked polyolefin particles with radiation before being added to the uncrosslinked rubber sheet 11'. Crosslinked polyolefin hollow particles can be obtained at this point by sufficiently irradiating the uncrosslinked polyolefin particles with radiation. The crosslinked polyolefin particles before mixture may be in a state in which spherical particles having a diameter of 10 μm or more and 50 μm or less coagulate like clusters.

Uncrosslinked rubber sheets 12' and 13' for making the adhesive rubber layer 12 and the backface rubber layer 13 are formed in a similar manner. After adhesion treatment in which twist yarn 14' to be the cord 14 is soaked in an RFL aqueous solution and heated, adhesion treatment in which the twist yarn 14' is soaked in rubber cement and is heated and dried, is performed.

Figure 5:
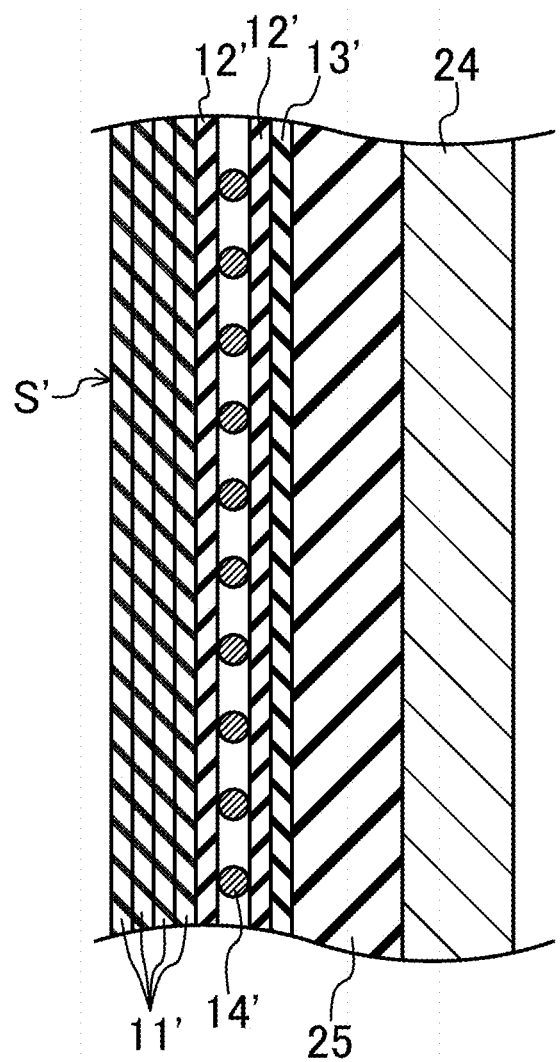
FIG. 5 is a first drawing for explaining a method for forming the V-ribbed belt according to the first embodiment.

Next, as shown in FIG. 5, a rubber sleeve 25 is placed on a cylindrical drum 24 having a smooth surface so as to cover the cylindrical drum 24. Then, the uncrosslinked rubber sheet 13' for making the backface rubber layer 13 and the uncrosslinked rubber sheet 12' for making the adhesive rubber layer 12 are sequentially wrapped around and layered on the cylindrical drum 24. After that, the twist yarn 14' for making the cord 14 is helically wrapped around the cylindrical inner mold 21 to extend on the wrapped uncrosslinked rubber sheet 12', and another uncrosslinked rubber sheet 12' for making the adhesive rubber layer 12 and the uncrosslinked rubber sheet 11' for making the compressed rubber layer are sequentially wrapped around and layered on the wrapped twist yarn 14', thereby forming an uncrosslinked slab S'. In this procedure, the uncrosslinked rubber sheets 11', 12', and 13' are wrapped such that the grain direction thereof corresponds to a belt length direction (i.e., a circumferential direction).

Figure 6:
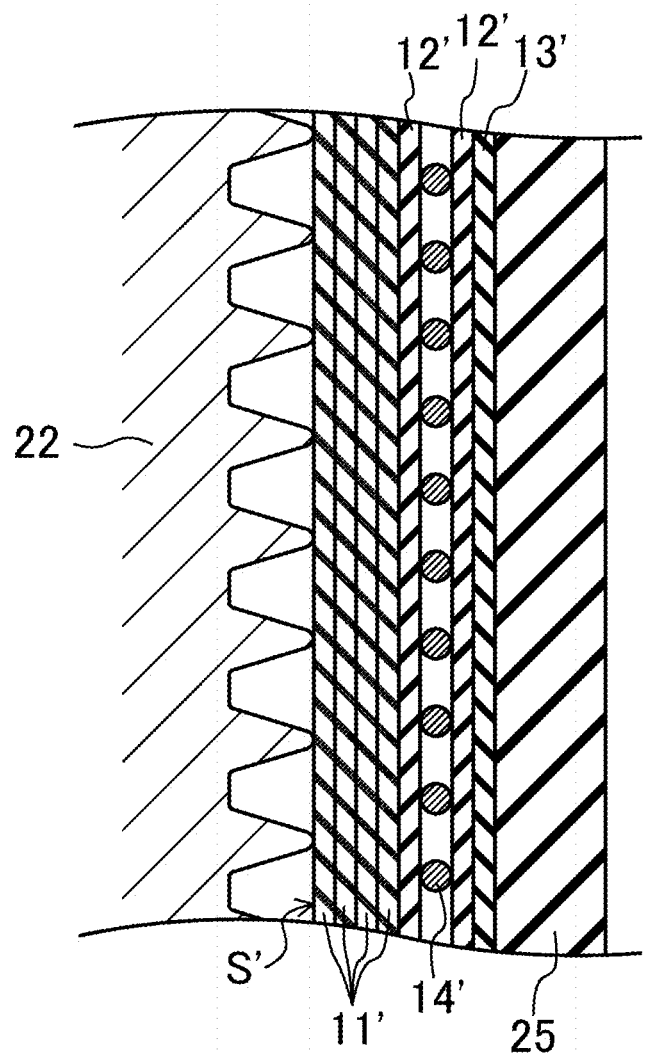
FIG. 6 is a second drawing for explaining the method for forming the V-ribbed belt according to the first embodiment.

Next, the rubber sleeve 25 having the uncrosslinked slab S' is removed from the cylindrical drum 24, and is then fitted to the inner circumferential surface of the outer mold 22 as shown in FIG. 6.

Figure 7:
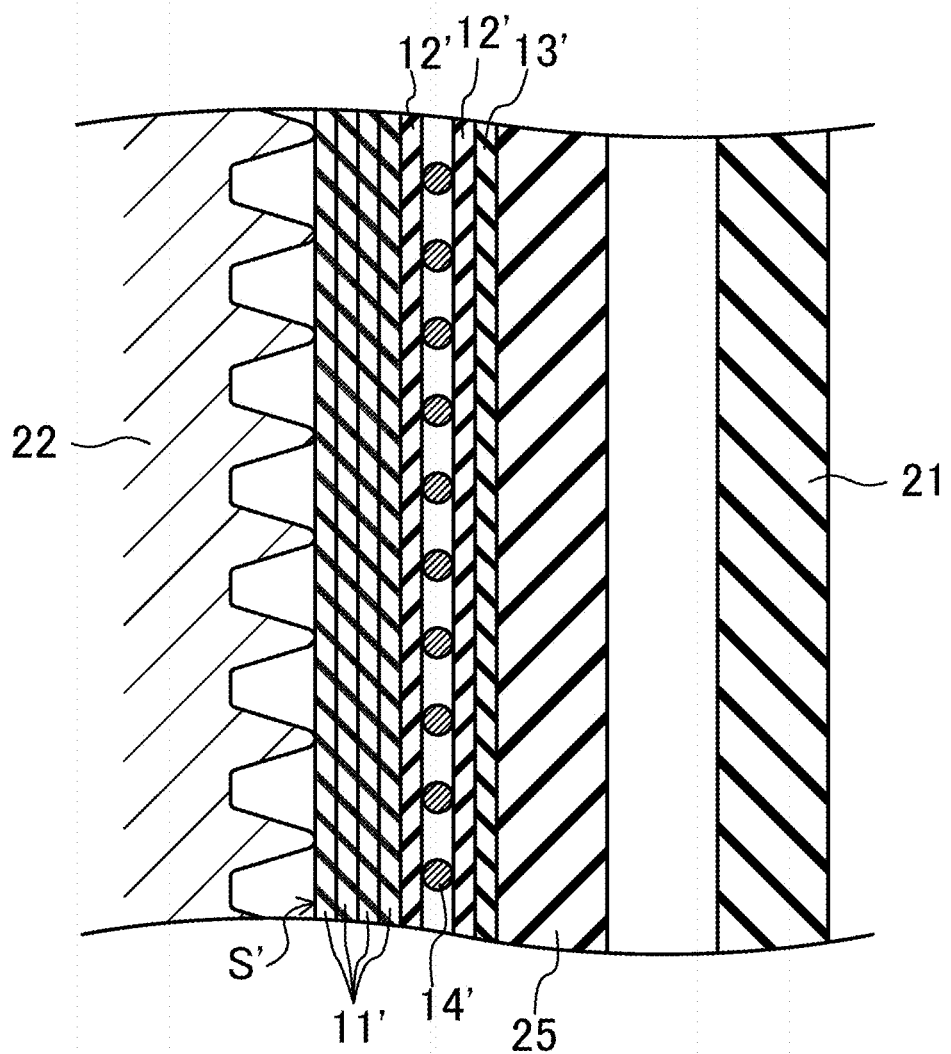
FIG. 7 is a third drawing for explaining the method for forming the V-ribbed belt according to the first embodiment.

Next, as shown in FIG. 7, the inner mold 21 is positioned inside the rubber sleeve 25 set in the outer mold 22, and hermetically sealed.

Figure 8:
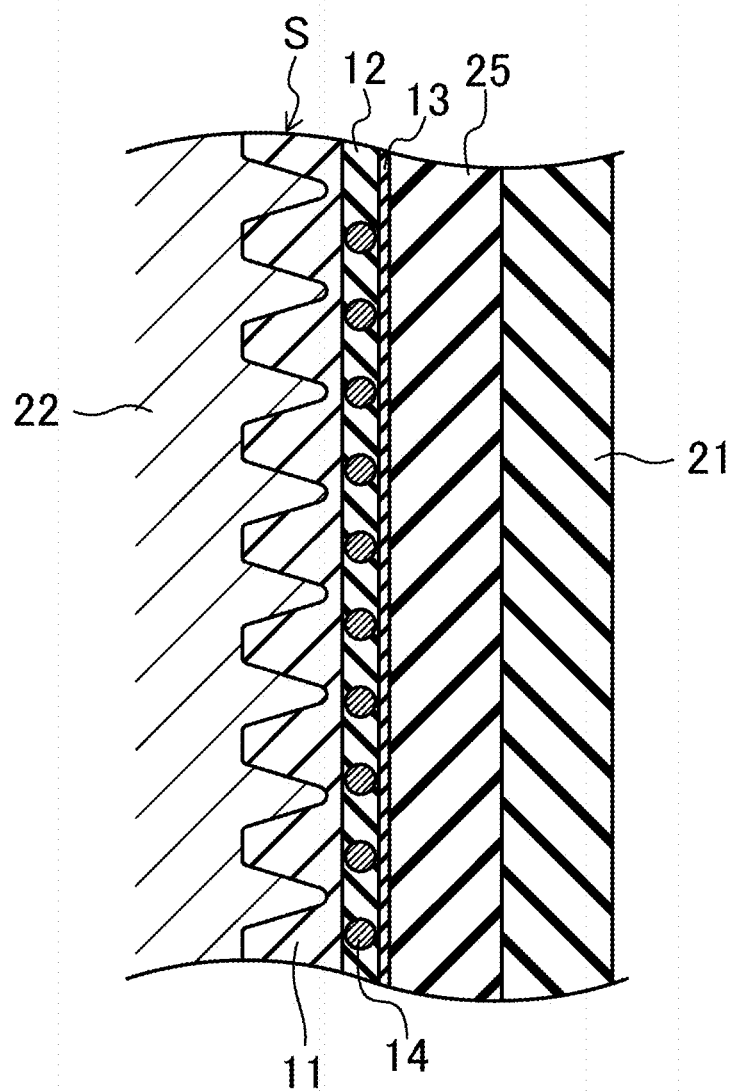
FIG. 8 is a fourth drawing for explaining the method for forming the V-ribbed belt according to the first embodiment.

Subsequently, the outer mold 22 is heated and the inner mold 21 is pressurized by introducing, for example, high-pressure air into its hermetically-sealed inner space. In this step, the inner mold 21 expands, and the uncrosslinked rubber sheets 11', 12', and 13', of the uncrosslinked slab S', for forming a belt are compressed on the molding surface of the outer mold 22, as shown in FIG. 8. At the same time, cross-linking of the rubber component is promoted in the sheets, and the sheets are integrated and combined with the twist yarn 14'. A cylindrical belt slab S is formed as a result. If the state of the crosslinked polyolefin particles before mixture is such that spherical particles having a diameter of 10 μm or more and 50 μm or less coagulate like clusters, the spherical particles are fused and integrated by heat, and formed into a spherical or ellipsoidal shape. The molding temperature of the belt slab S ranges from 100° C. to 180° C., for example. The molding pressure ranges from 0.5 MPa to 2.0 MPa, for example. The molding time ranges from 10 minutes to 60 minutes, for example.

Next, the pressure of the inner space of the inner mold 21 is reduced to remove the sealing, and the belt slab S formed between the inner mold 21 and the outer mold 22 via the rubber sleeve 25 is removed. The belt slab S is cut into rings having a predetermined width, and turned inside out, thereby obtaining the V-ribbed belt B. If necessary, an outer surface of the belt slab S, i.e., a surface having the V-shaped ribs 15, may be polished.

Figure 9:
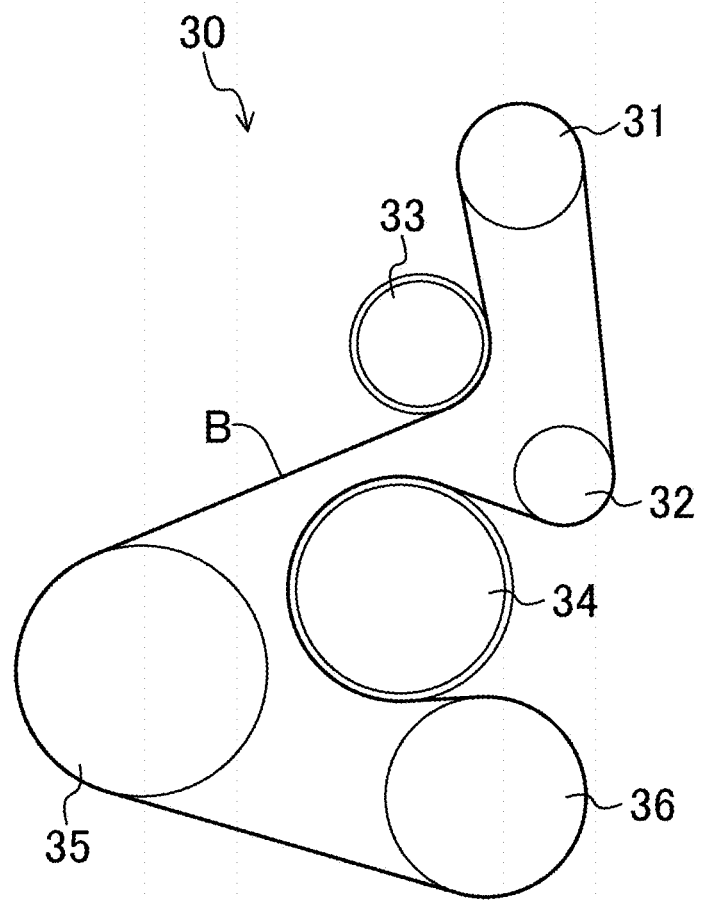
FIG. 9 illustrates a layout of pulleys of an accessory drive belt transmission system of an automobile.

FIG. 9 illustrates a layout of pulleys of an accessory drive belt transmission system 30 of an automobile using the V-ribbed belt B according to the first embodiment. The accessory drive belt transmission system 30 is a serpentine drive system in which the V-ribbed belt B is wrapped around six pulleys including four ribbed pulleys and two flat pulleys to transmit power.

The accessory drive belt transmission system 30 includes a power steering pulley 31, which is a ribbed pulley, at an uppermost position, and an AC generator pulley 32, which is a ribbed pulley, located below the power steering pulley 31. The system 30 also includes a tensioner pulley 33, which is a flat pulley, located at a lower left position of the power steering pulley 31, and a water pump pulley 34, which is a flat pulley, located below the tensioner pulley 33. The system 30 further includes a crank shaft pulley 35, which is a ribbed pulley, located at a lower left position of the tensioner pulley 33, and an air conditioning pulley 36, which is a ribbed pulley, located at a lower right position of the crank shaft pulley 35. These pulleys are made, for example, of pressed metals or castings, or resin moldings using, e.g., nylon resin and phenol resin, with a pulley diameter ranging from φ50 mm to φ150 mm.

In the accessory drive belt transmission system 30, the V-ribbed belt B is wrapped around the power steering pulley 31 with the V-shaped ribs 15 brought into contact with the power steering pulley 31, and then around the tensioner pulley 33 with the backface of the belt B brought into contact with the tensioner pulley 33. After that, the belt B is sequentially wrapped around the crank shaft pulley 35 and the air conditioning pulley 36 with the V-shaped ribs 15 brought into contact with the crank shaft pulley 35 and the air conditioning pulley 36, and further around the water pump pulley 34 with the backface of the belt B brought into contact with the water pump pulley 34. The belt B is then wrapped around the AC generator pulley 32 with the V-shaped ribs 15 brought into contact with the AC generator pulley 32, and returns to the power steering pulley 31 in the end. The belt span length, which is a length of the V-ribbed belt B between the pulleys, ranges from 50 mm to 300 mm, for example. The degree of misalignment allowable between the pulleys ranges from 0° to 2°.

Second Embodiment

Figure 10:
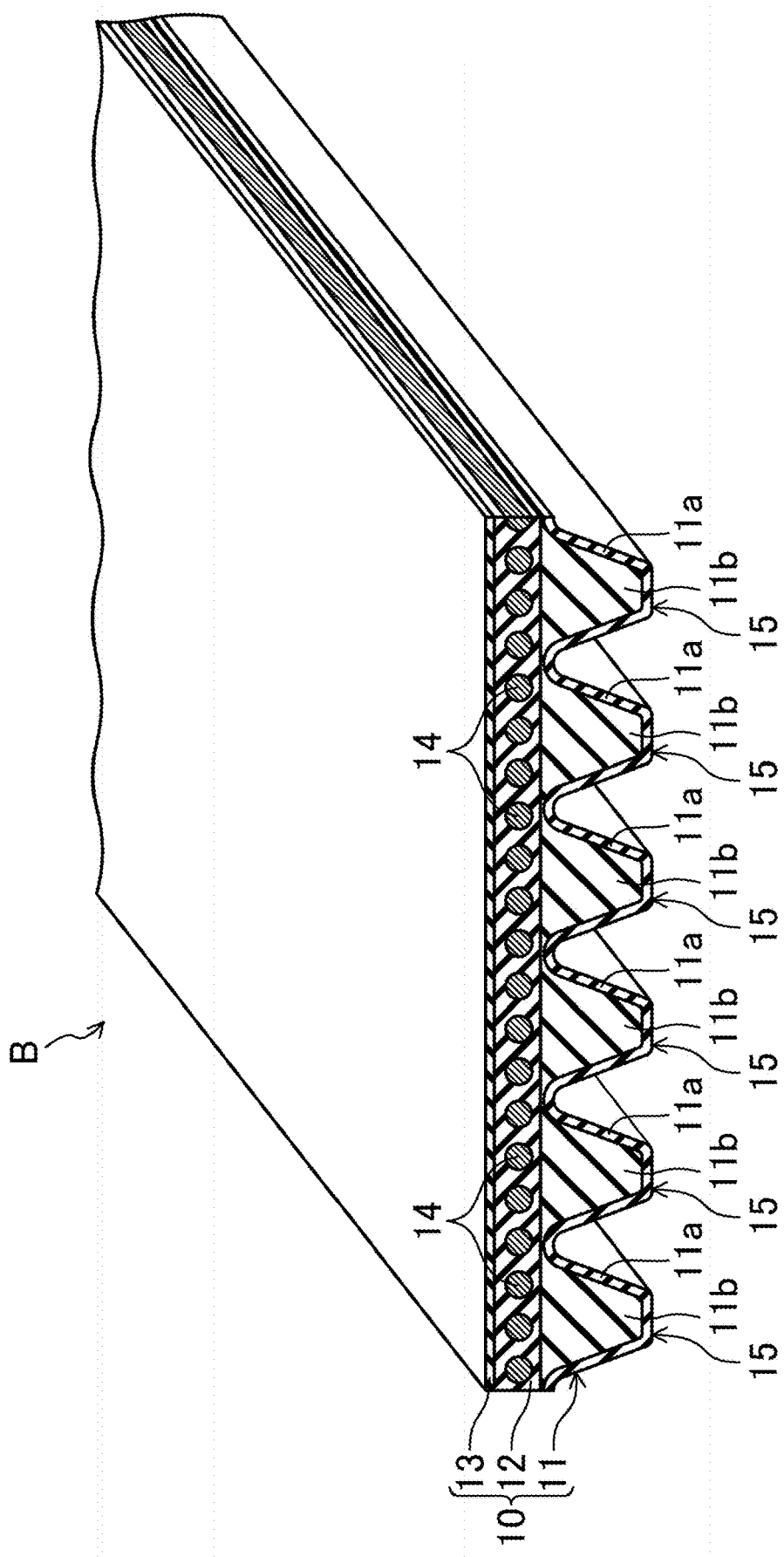
FIG. 10 illustrates a perspective view of a V-ribbed belt piece according to a second embodiment.
Figure 11:
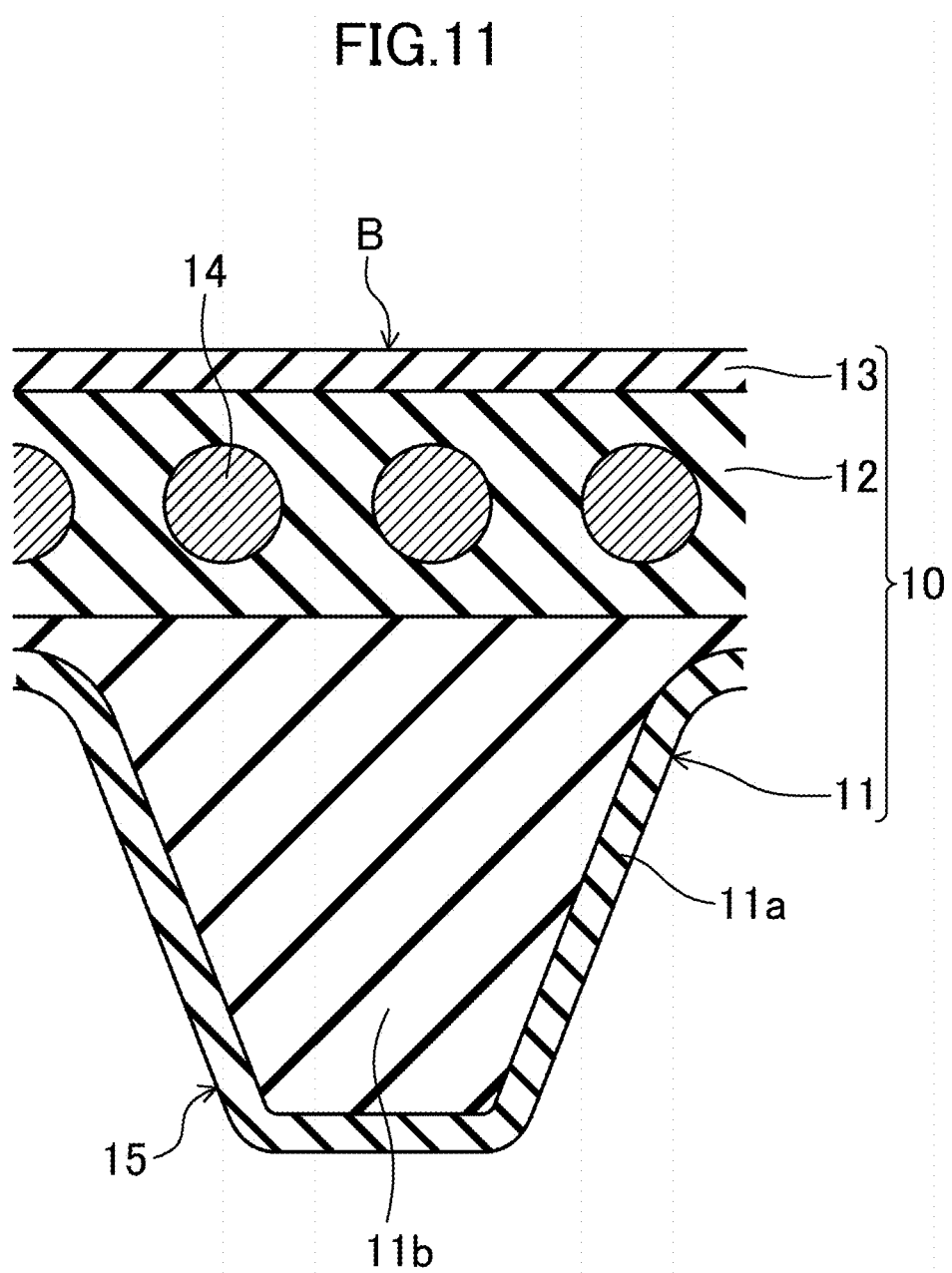
FIG. 11 illustrates a cross-sectional view of a single V-shaped rib of the V-ribbed belt according to the second embodiment.

FIGS. 10 and 11 illustrate a V-ribbed belt B of a second embodiment. Like reference characters have been used to designate the same elements as those in the first embodiment.

According to the second embodiment, the compressed rubber layer 11 of the V-ribbed belt B has a surface rubber layer 11a and a core rubber portion 11b covered with the surface rubber layer 11a. The surface rubber layer 11a is provided along the entire surface portions of the V-shaped ribs 15 and forms a pulley contacting portion of the inner side portion of the belt. The surface rubber layer 11a has a thickness ranging from 50 μm to 500 μm, for example. The core rubber portion 11b is provided on a belt inner side of the surface rubber layer 11a and forms the other portion of the compressed rubber layer 11 besides the surface rubber layer 11a.

Similarly to the compressed rubber layer 11 of the first embodiment, the surface rubber layer 11a is made of a rubber composition containing a crosslinked rubber component and various compound ingredients including crosslinked polyolefin particles dispersed in the rubber component.

The core rubber portion 11b is made of a rubber composition containing a crosslinked rubber component and various compound ingredients. The rubber composition making the core rubber portion 11b may contain crosslinked polyolefin particles, the content of which with respect to 100 parts by mass of the rubber component is suitably less than the content of the crosslinked polyolefin particles in the rubber composition making the surface rubber layer 11a with respect to 100 parts by mass of the rubber component. In order to increase the flex fatigue resistance, however, it is suitable that the rubber composition making the core rubber portion 11b contains substantially no crosslinked polyolefin particles. Specifically, the content of the crosslinked polyolefin particles with respect to 100 parts by mass of the rubber component is suitably 10 parts by mass or less, more suitably 5 parts by mass or less, still more suitably 2 parts by mass or less, and most suitably 0 part by mass. The rubber composition making the core rubber portion 11b may contain uncrosslinked polyolefin particles, but suitably contains substantially no uncrosslinked polyolefin particles similarly to the crosslinked polyolefin particles.

The rubber composition making the core rubber portion 11b may be the same as the rubber composition making the adhesive rubber layer 12 or the backface rubber layer 13.

The V-ribbed belt B according to the second embodiment described above exhibits significantly high wear resistance because the surface rubber layer 11a of the compressed rubber layer 11 forming the pulley contacting portion is made of the rubber composition containing the crosslinked polyolefin particles. A smaller content of the crosslinked polyolefin particles in the core rubber portion 11b than in the surface rubber layer 11a reduces the formation of cracks starting from the crosslinked polyolefin particles in the core rubber portion 11b, and therefore contributes to increasing the flex fatigue resistance.

Figure 12:
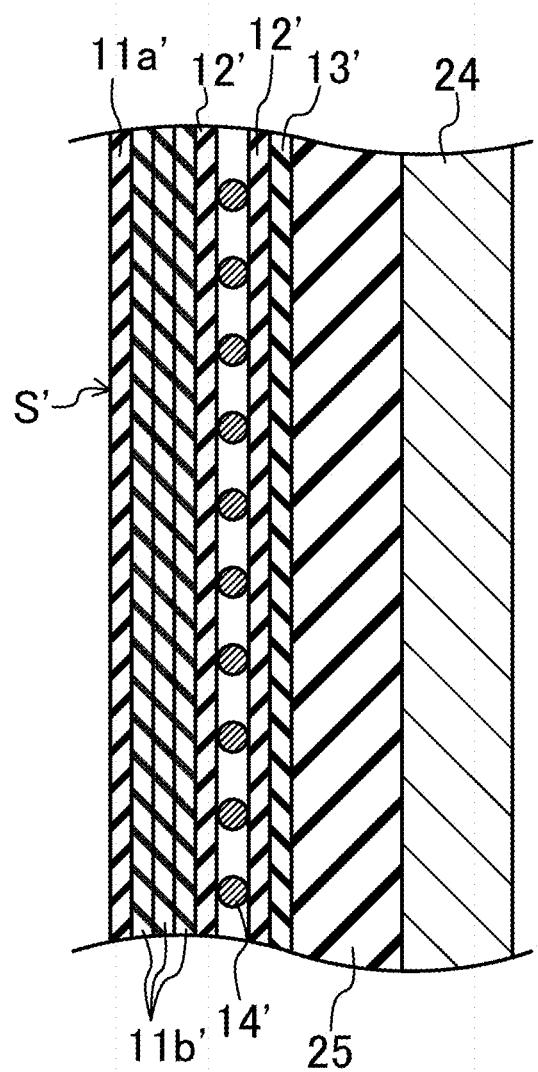
FIG. 12 is a first drawing for explaining a method for forming the V-ribbed belt according to the second embodiment.
Figure 13:
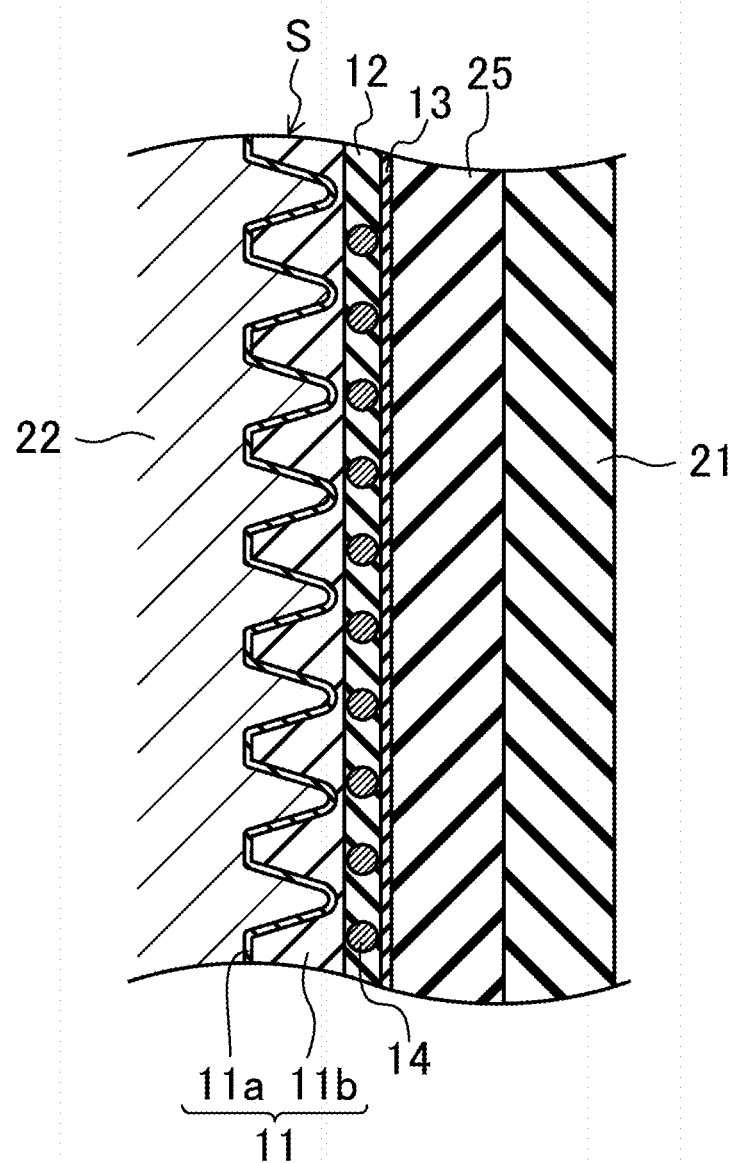
FIG. 13 is a second drawing for explaining the method for forming the V-ribbed belt according to the second embodiment.

In order to form the V-ribbed belt B according to the second embodiment, uncrosslinked rubber sheets 11a', 11b' for making the surface rubber layer and core rubber portion of the compressed rubber layer 11 are prepared. The uncrosslinked rubber sheet 11a' for making the surface rubber layer contains crosslinked polyolefin particles. Next, as shown in FIG. 12, by a similar method to the method of the first embodiment, the uncrosslinked rubber sheet 13' for making the backface rubber layer 13 and the uncrosslinked rubber sheet 12' for making the adhesive rubber layer 12 are sequentially wrapped around and layered on a rubber sleeve 25 placed on a cylindrical drum 24 having a smooth surface. After that, the twist yarn 14' for making the cord 14 is helically wrapped around the cylindrical inner mold 21 to extend on the wrapped uncrosslinked rubber sheet 12'. Another uncrosslinked rubber sheet 12' for making the adhesive rubber layer 12, an uncrosslinked rubber sheet 11b' for making the core rubber portion of the compressed rubber layer 11, and an uncrosslinked rubber sheet 11a' for making the surface rubber layer are sequentially wrapped around and layered on the wrapped twist yarn 14', thereby forming an uncrosslinked slab S'. A cylindrical belt slab S as illustrated in FIG. 13 is formed from this uncrosslinked slab S'.

The other features and advantages are the same as those of the first embodiment.

Third Embodiment

Figure 14:
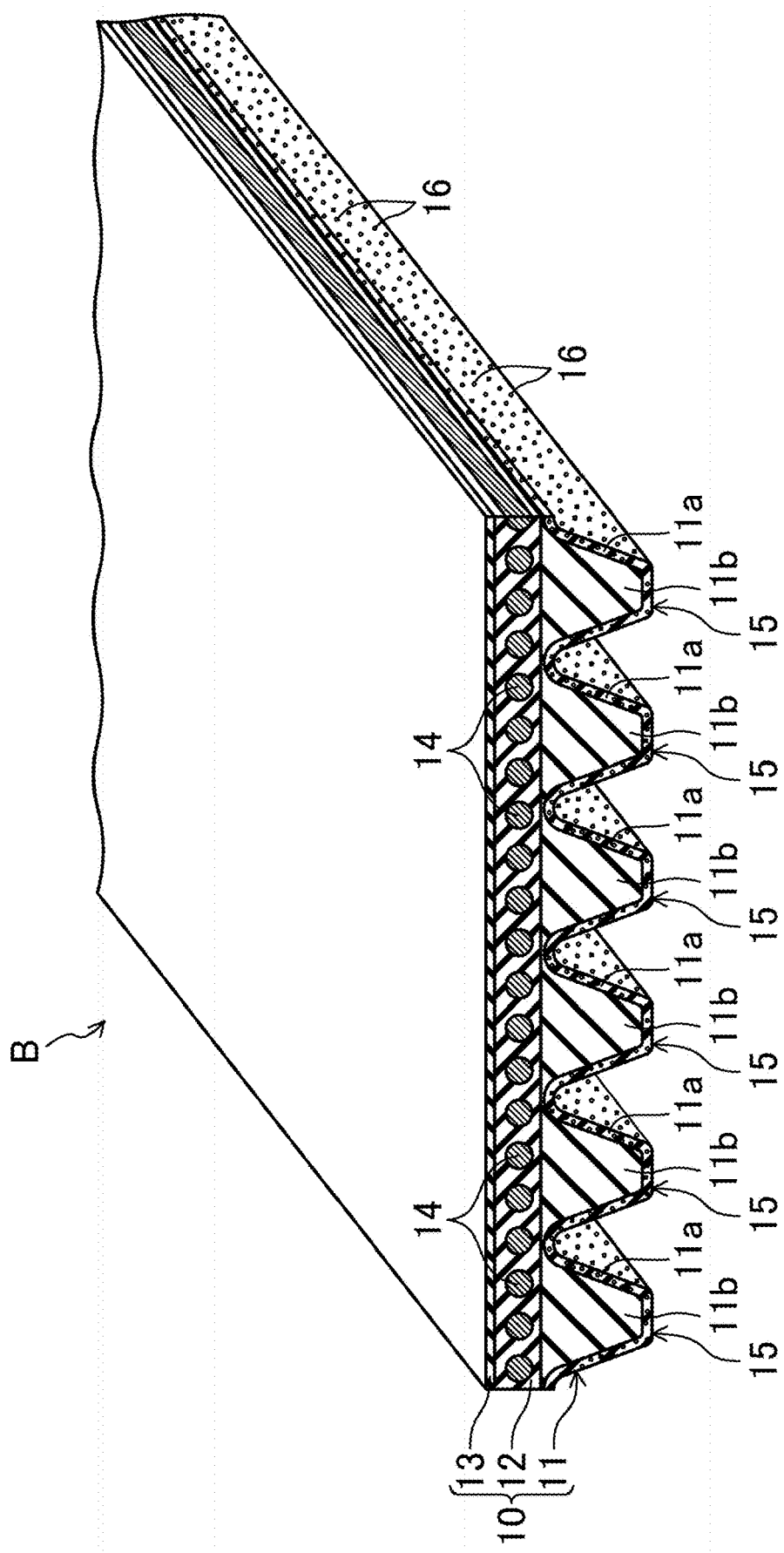
FIG. 14 illustrates a perspective view of a V-ribbed belt piece according to a third embodiment.
Figure 15:
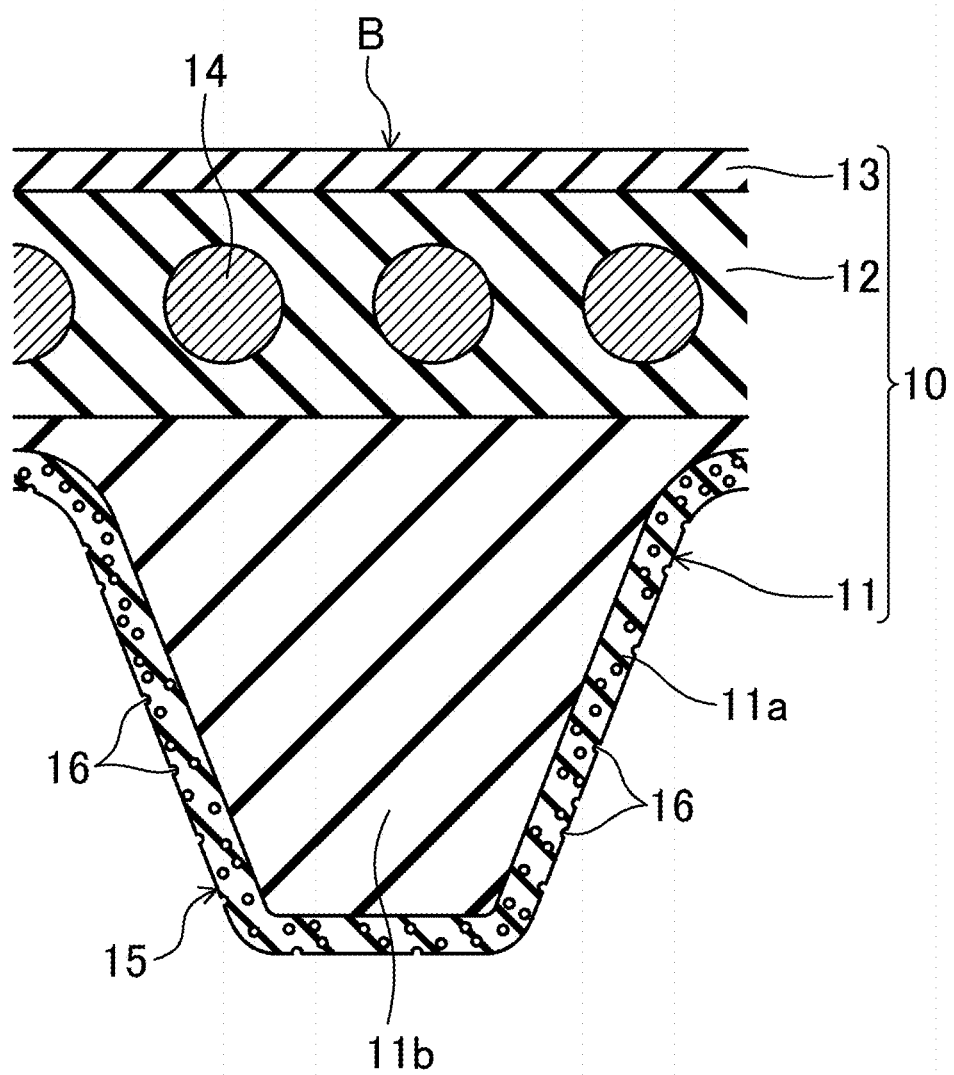
FIG. 15 illustrates a cross-sectional view of a single V-shaped rib of the V-ribbed belt according to the third embodiment.

FIGS. 14 and 15 illustrate a V-ribbed belt B of a third embodiment. Like reference characters have been used to designate the same elements as those in the first embodiment.

According to the third embodiment, the compressed rubber layer 11 of the V-ribbed belt B has a surface rubber layer 11a and a core rubber portion 11b covered with the surface rubber layer 11a. The surface rubber layer 11a is made of porous rubber, provided along the entire surfaces of the V-shaped ribs 15, and forms a pulley contacting portion of the inner side portion of the belt. The surface rubber layer 11a has a thickness ranging from 50 μm to 500 μm, for example. The core rubber portion 11b is made of solid rubber, provided on the belt inner side of the surface rubber layer 11a, and forms the other portion of the compressed rubber layer 11 besides the surface rubber layer 11a.

The term "porous rubber" used herein means a crosslinked rubber composition having many hollow portions therein and having a surface with many recesses 16, and may have either a structure in which the hollow portions and the recesses 16 are distributed or a structure in which the hollow portions and the recesses 16 are connected together. The term "solid rubber" used herein means a crosslinked rubber composition that is not made of "porous rubber" and has no hollow portions or no recesses 16.

Similarly to the compressed rubber layer 11 of the first embodiment, the surface rubber layer 11a is made of a rubber composition containing a crosslinked rubber component and various compound ingredients including crosslinked polyolefin particles dispersed in the rubber component. In addition, the surface rubber layer 11a is made of porous rubber. Thus, the uncrosslinked rubber composition before being formed into the surface rubber layer 11a contains unexpanded hollow particles and/or a foaming agent for forming porous rubber.

Examples of the unexpanded hollow particles include particles including a solvent encapsulated in a shell made of a thermoplastic polymer (e.g., an acrylonitrile polymer) or any other suitable material. The hollow particles may be comprised of either one kind or two or more kinds of these particles. The content of the hollow particles with respect to 100 parts by mass of the rubber component is suitably 0.5 parts by mass or more and 10 parts by mass or less. Examples of the foaming agent include organic foaming agents, such as an ADCA foaming agent containing azodicarbonamide as the main ingredient, a DPT foaming agent containing dinitrosopentamethylenetetramine as the main ingredient, an OBSH foaming agent containing p,p'-oxybisbenzenesulfonylhydrazide as the main ingredient, and an HDCA foaming agent containing hydrazodicarbonamide as the main ingredient. Suitably, the foaming agent is comprised of one kind or two or more kinds of these substances. The content of the foaming agent with respect to 100 parts by mass of the rubber component is suitably 0.5 parts by mass or more and 10 parts by mass or less.

The surface rubber layer 11a, which is made of porous rubber, has a surface with many recesses 16. The average diameter of the recesses 16 is suitably 10 μm or more and 150 μm or less. The average diameter of the recesses 16 is determined by the number-average diameter of 50 or more and 100 or less recesses measured with a surface image.

The core rubber portion 11b is made of a rubber composition containing a crosslinked rubber component and various compound ingredients. The rubber composition making the core rubber portion 11b may contain crosslinked polyolefin particles, the content of which with respect to 100 parts by mass of the rubber component is suitably less than the content of the crosslinked polyolefin particles in the rubber composition making the surface rubber layer 11a with respect to 100 parts by mass of the rubber component. In order to increase the flex fatigue resistance, however, it is suitable that the rubber composition making the core rubber portion 11b contains substantially no crosslinked polyolefin particles. Specifically, the content of the crosslinked polyolefin particles with respect to 100 parts by mass of the rubber component is suitably 10 parts by mass or less, more suitably 5 parts by mass or less, still more suitably 2 parts by mass or less, and most suitably 0 part by mass. The rubber composition making the core rubber portion 11b may contain uncrosslinked polyolefin particles, but suitably contains substantially no uncrosslinked polyolefin particles similarly to the crosslinked polyolefin particles.

The rubber composition making the core rubber portion 11b may be the same as the rubber composition making the surface rubber layer 11a except the hollow portions and the recesses 16. The rubber composition making the core rubber portion 11b may be the same as the rubber composition making the adhesive rubber layer 12 or the backface rubber layer 13.

The rubber composition making the core rubber portion 11b may be the same as the rubber composition making the adhesive rubber layer 12 or the backface rubber layer 13.

Although expected to have low wear resistance due to being made of porous rubber, the V-ribbed belt B according to the third embodiment described above exhibits significantly high wear resistance because the surface rubber layer 11a of the compressed rubber layer 11 forming the pulley contacting portion is made of the rubber composition containing the crosslinked polyolefin particles. A smaller content of the crosslinked polyolefin particles in the core rubber portion 11b than in the surface rubber layer 11a reduces the formation of cracks starting from the crosslinked polyolefin particles in the core rubber portion 11b, and therefore contributes to increasing the flex fatigue resistance.

Figure 16:
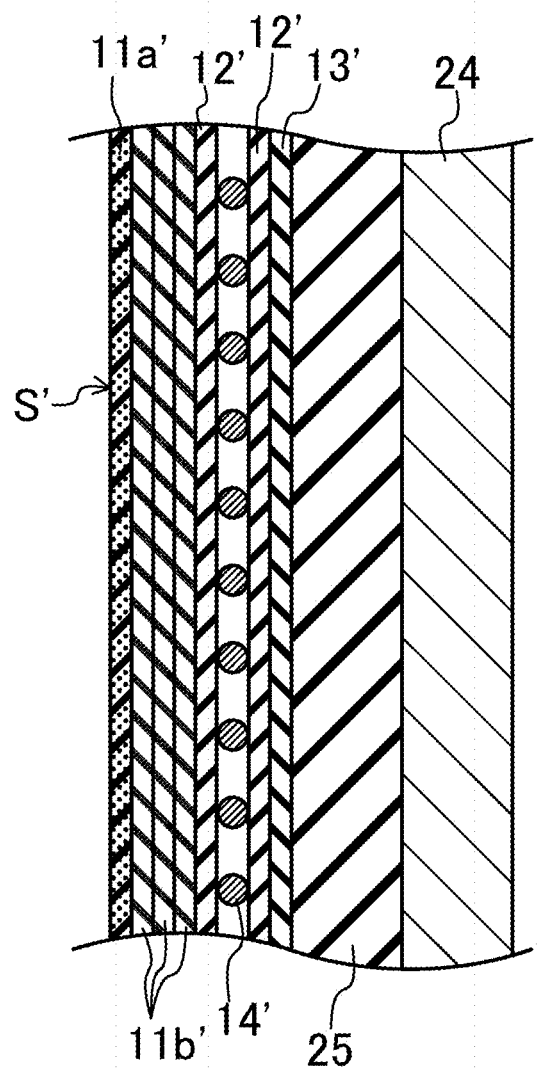
FIG. 16 is a first drawing for explaining a method for forming the V-ribbed belt according to the third embodiment.
Figure 17:
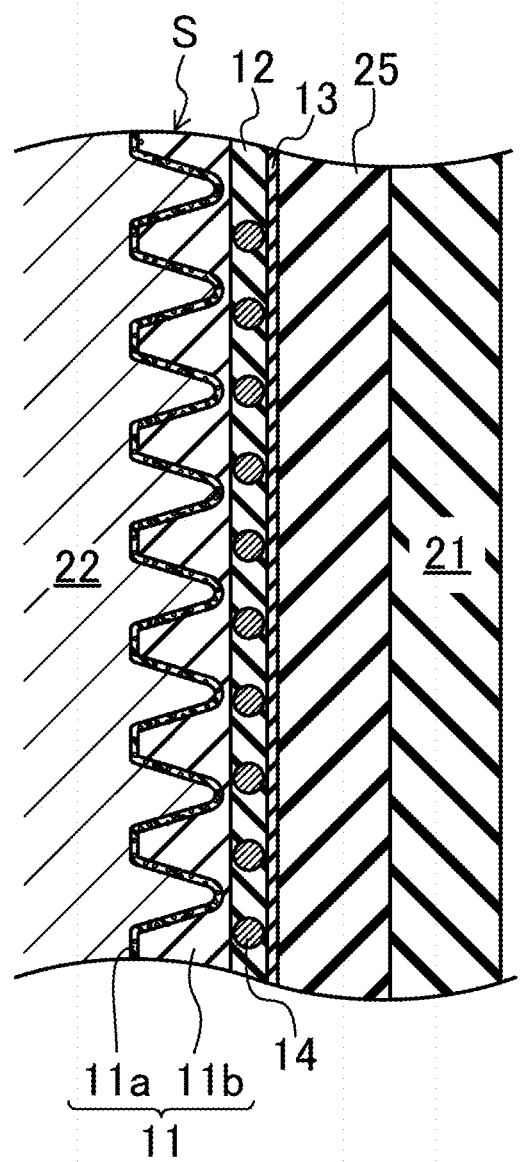
FIG. 17 is a second drawing for explaining the method for forming the V-ribbed belt according to the third embodiment.

In order to form the V-ribbed belt B according to the third embodiment, uncrosslinked rubber sheets 11a', 11b' for making the surface rubber layer and core rubber portion of the compressed rubber layer 11 are prepared. In addition to the polyolefin particles, hollow particles and/or a foaming agent are/is added to the uncrosslinked rubber sheet 11a' for making the surface rubber layer 11a. Next, as shown in FIG. 16, by a similar method to the method of the first embodiment, the uncrosslinked rubber sheet 13' for making the backface rubber layer 13 and the uncrosslinked rubber sheet 12' for making the adhesive rubber layer 12 are sequentially wrapped around and layered on a rubber sleeve 25 placed on a cylindrical drum 24 having a smooth surface. After that, the twist yarn 14' for making the cord 14 is helically wrapped around the cylindrical inner mold 21 to extend on the wrapped uncrosslinked rubber sheet 12'. Another uncrosslinked rubber sheet 12' for making the adhesive rubber layer 12, an uncrosslinked rubber sheet 11b' for making the core rubber portion of the compressed rubber layer 11, and an uncrosslinked rubber sheet 11a' for making the surface rubber layer are sequentially wrapped around and layered on the wrapped twist yarn 14', thereby forming an uncrosslinked slab S'. A cylindrical belt slab S as illustrated in FIG. 17 is formed from this uncrosslinked slab S'.

The other features and advantages are the same as those of the first embodiment.

Fourth Embodiment

Figure 18:
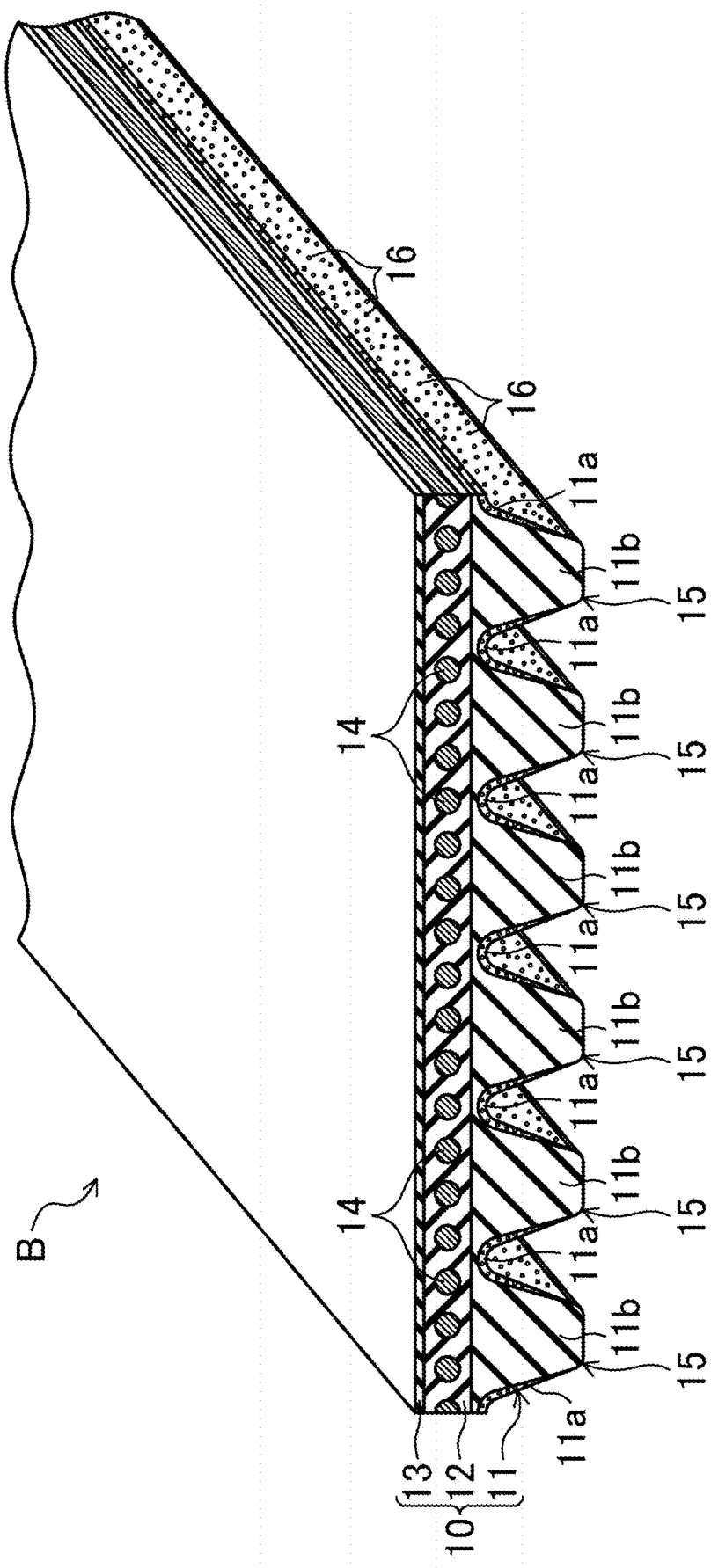
FIG. 18 illustrates a perspective view of a V-ribbed belt piece according to a fourth embodiment.
Figure 19:
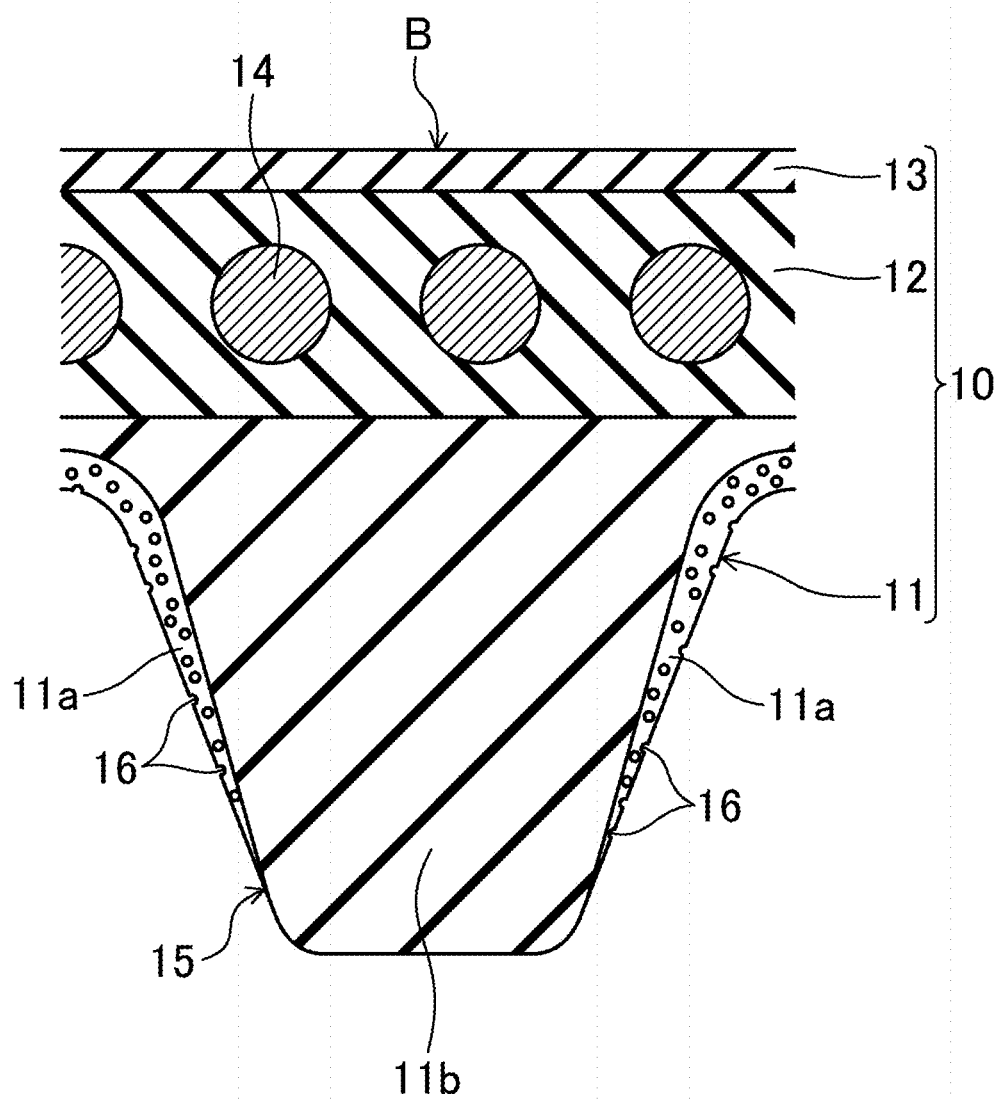
FIG. 19 illustrates a cross-sectional view of a single V-shaped rib of the V-ribbed belt according to the fourth embodiment.

FIGS. 18 and 19 illustrate a V-ribbed belt B of a fourth embodiment. Like reference characters have been used to designate the same elements as those in the first and third embodiments.

According to the fourth embodiment, the compressed rubber layer 11 of the V-ribbed belt B has a surface rubber layer 11a and a core rubber portion 11b partially covered with the surface rubber layer 11a. The surface rubber layer 11a is made of porous rubber. The surface rubber layer 11a is provided along outer side surface portions of the outermost ones of the V-shaped ribs 15, and also along opposed side surface portions of a pair of V-shaped ribs 15 arranged adjacent to each other and a bottom portion, between the pair of ribs 15, which connects these opposed side surfaces together. The surface rubber layer 11a forms a pulley contacting portion of the inner side portion of the belt. The surface rubber layer 11a along the opposed side surfaces of the adjacent ribs 15 has an inverted U-shaped cross-section. That is, the surface rubber layer 11a is provided so as to include the outer side surface portions of the outermost V-shaped ribs 15 or the opposed side surface portions of the pair of V-shaped rib 15 adjacent to each other. The surface rubber layer 11a has a thickness ranging from 50 µm to 500 µm, for example. The core rubber portion 11b is made of solid rubber, located inside the surface rubber layer 11a, and forms the other portion of the compressed rubber layer 11 besides the surface rubber layer 11a.

Figure 20:
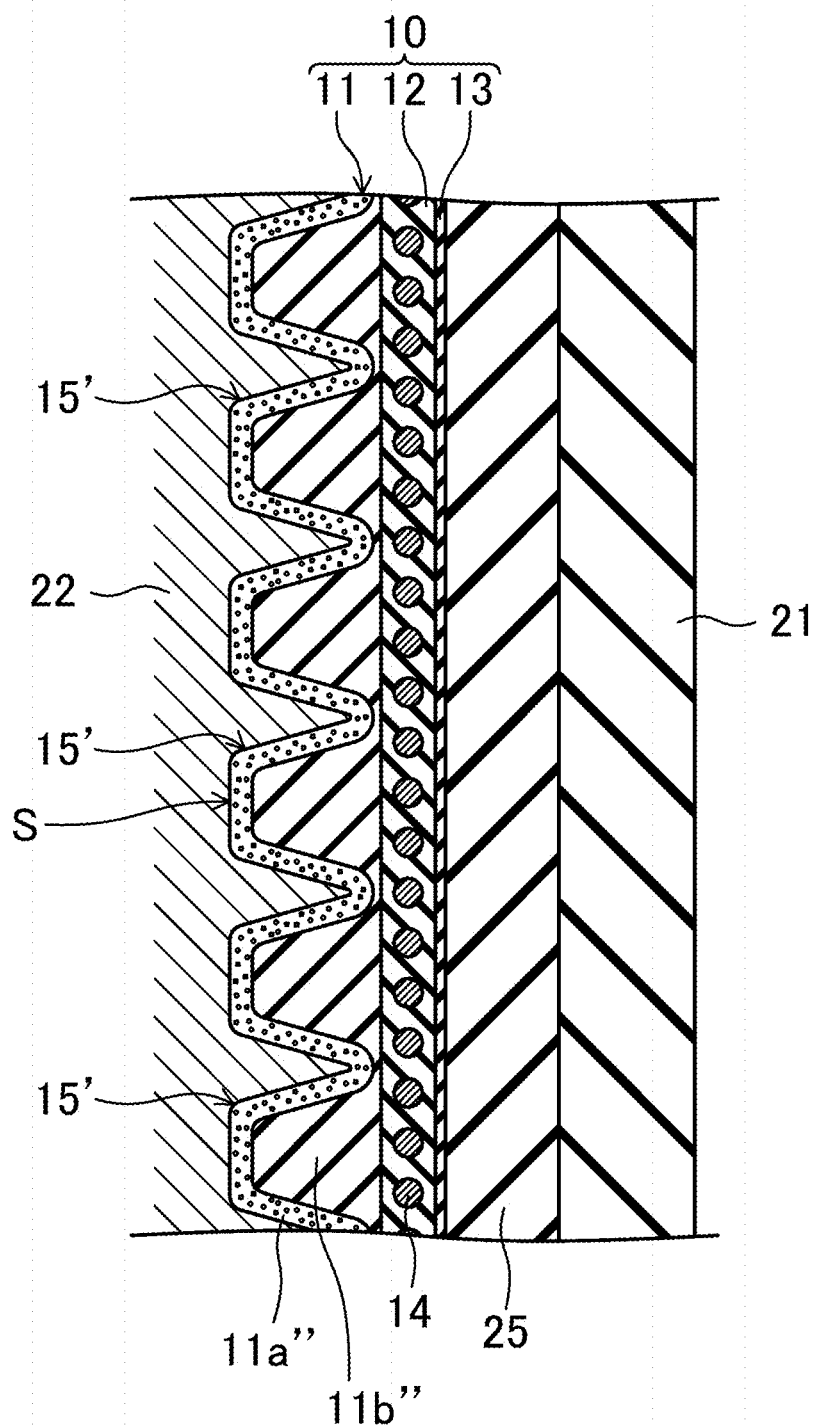
FIG. 20 is a first drawing for explaining a method for forming the V-ribbed belt according to the fourth embodiment.
Figure 21:
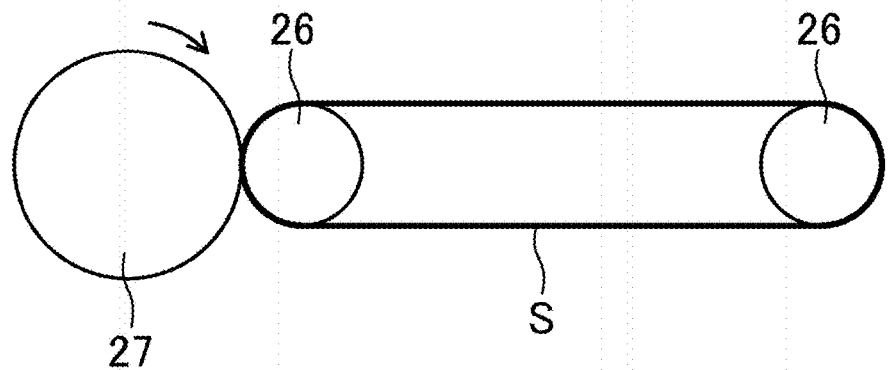
FIG. 21 is a second drawing for explaining the method for forming the V-ribbed belt according to the fourth embodiment.
Figure 22:
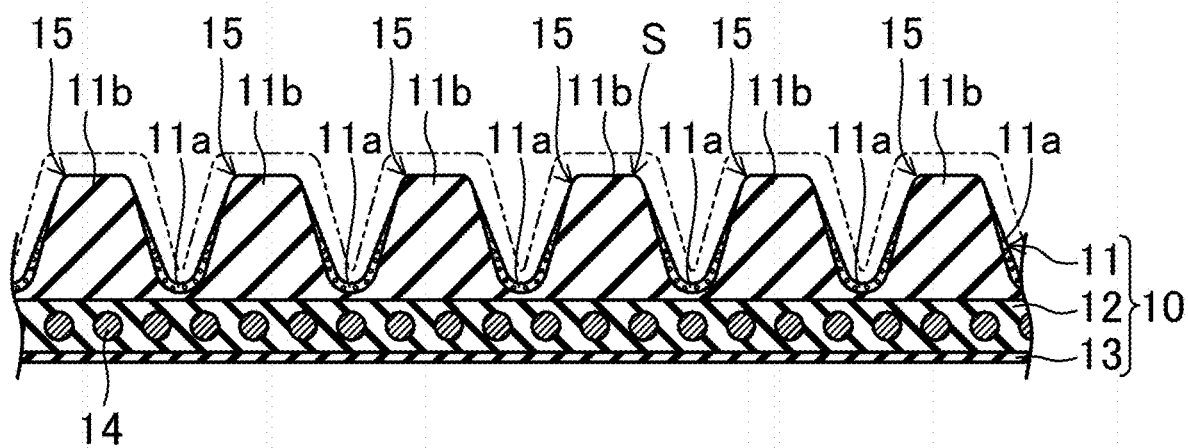
FIG. 22 is a third drawing for explaining the method for forming the V-ribbed belt according to the fourth embodiment.

To form the V-ribbed belt B of the fourth embodiment, a cylindrical belt slab S shown in FIG. 20 is formed by a process similar to that in the third embodiment. This belt slab S has an outer surface having protrusions 15' that extend circumferentially and have a substantially trapezoidal cross-section. The protrusions 15' are sequentially arranged in an axial direction, and have a surface layer made of porous rubber 11a" and the other inner portion made of solid rubber 11b". Next, as shown in FIG. 21, the belt slab S is looped over a pair of slab holding shafts 26. A grinding stone 27, which has V-shaped rib formation grooves extending in a circumferential direction of the grinding stone 27 and sequentially arranged on the outer circumferential surface along an axial direction of the grinding stone 27, is rotated and brought into contact with the outer circumferential surface of the belt slab S, and the belt slab S is also rotated on the pair of slab holding shafts 26. As a result, as shown in FIG. 22, grinding the protrusions on the outer surface of the belt slab S provides a plurality of V-shaped ribs 15, which each include a surface rubber layer 11a of porous rubber and a core rubber portion 11b of solid rubber.

The other features and advantages are the same as those of the first and third embodiments.

Other Embodiments

Figure 23B:
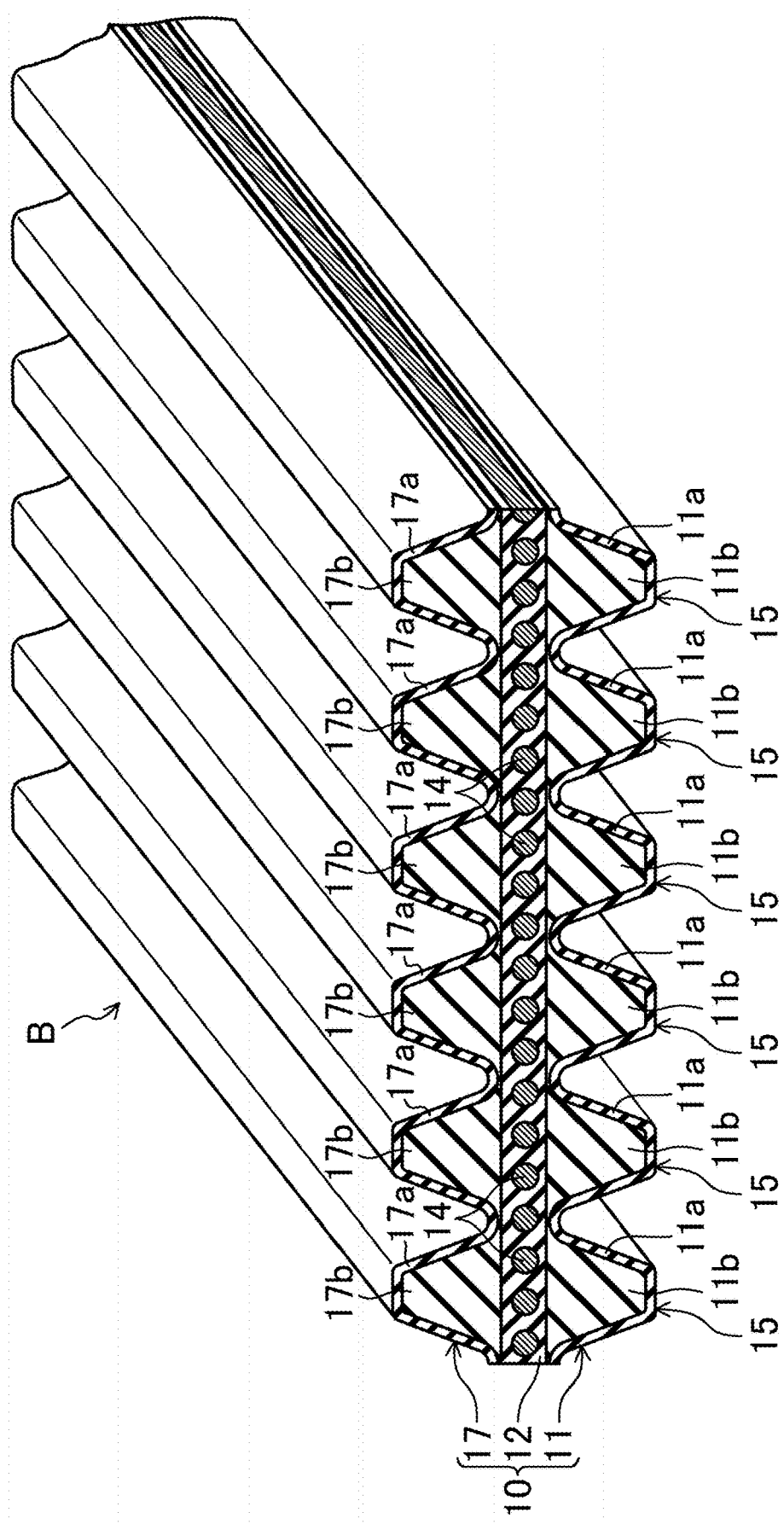
FIG. 23B is a perspective view of a double-sided V-ribbed belt piece according to another embodiment corresponding to the second embodiment.

The V-ribbed belts B have been described as non-limiting examples in the first to fourth embodiments. As illustrated in FIG. 23A, the belt may be a double-sided V-ribbed belt B which has, in addition to the compressed rubber layer 11 of the inner side portion of the belt, an extensible rubber layer 17 having a configuration similar to the configuration of the compressed rubber layer 11 and forming a pulley contacting portion of the outer side portion of the belt. As illustrated in FIGS. 23B to 23D, the belt may be a double-sided V-ribbed belt B which has, in addition to the compressed rubber layer 11 of the inner side portion of the belt, an extensible rubber layer 17 comprised of a surface rubber layer 17a having a configuration similar to the configuration of the compressed rubber layer 11 and forming a pulley contacting portion of the outer side portion of the belt, and a core rubber portion 17b.

Figure 24A:
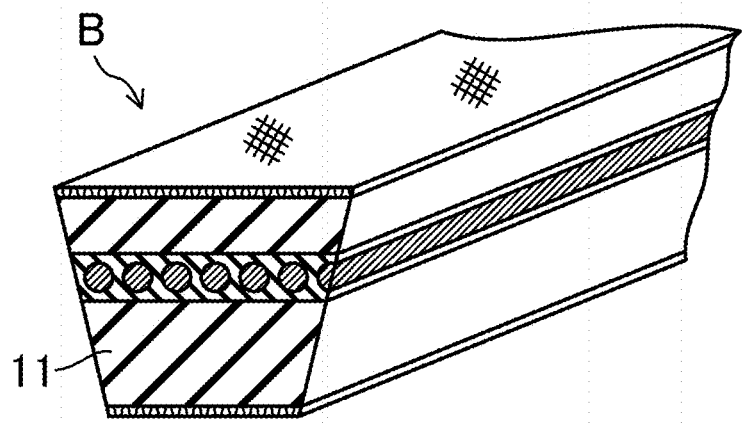
FIG. 24A illustrates a perspective view of a raw edge V-belt piece according to another embodiment.
Figure 24B:
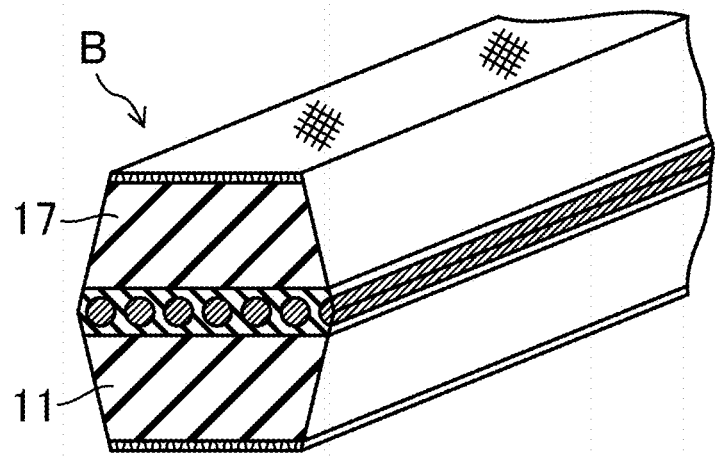
FIG. 24B is a perspective view of a double-sided raw edge V-belt piece according to another embodiment.

The V-ribbed belts B have been described as non-limiting examples in the first to fourth embodiments. The belt may be a raw edge V-belt B having a compressed rubber layer 11 forming a pulley contacting portion of the inner side portion of the belt. As illustrated in FIG. 24B, the belt may also be a double-sided raw edge V-belt B which has, in addition to the compressed rubber layer 11 of the inner side portion of the belt, an extensible rubber layer 17 having a configuration similar to the configuration of the compressed rubber layer 11 and forming a pulley contacting portion of the outer side portion of the belt.

Figure 25:
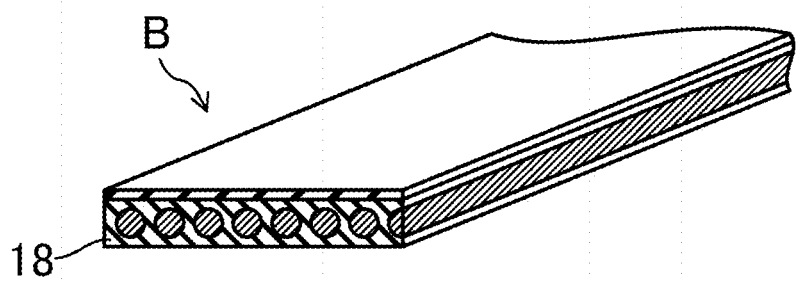
FIG. 25 is a perspective view of a flat belt piece according to another embodiment.

The V-ribbed belts B have been described as non-limiting examples in the first to fourth embodiments. As illustrated in FIG. 25, the belt may also be a flat belt B having an inner rubber layer 18 forming a pulley contacting portion of the inner side portion of the belt.

EXAMPLES

Example 1

(V-Ribbed Belt)

V-ribbed belts of the following Example 1-1 and Comparative Example 1-1, each having a configuration similar to the configuration of the third embodiment, were produced. The composition of each belt will also be shown in Table 1.

Example 1-1

An EPDM as a rubber component was placed in a chamber of an internal Banbury mixer and was masticated therein. Subsequently, with respect to 100 parts by mass of this rubber component, 2 parts by mass of carbon black, 40 parts by mass of silica, 5 parts by mass of calcium carbonate, 80 parts by mass of ultrahigh molecular weight polyethylene particles, 40 parts by mass of layered silicate (bentonite), 2.7 parts by mass of hollow particles, 0.5 parts by mass of stearic acid, 5 parts by mass of zinc oxide, 8 parts by mass (3.2 parts by mass) of an organic peroxide crosslinking agent, the purity of which is 40% by mass, and 2 parts by mass of a co-crosslinking agent were added thereto and kneaded. A V-ribbed belt having a compressed rubber layer, a surface rubber layer of which was made of the obtained uncrosslinked rubber composition, was produced as Example 1-1.

The ultrahigh molecular weight polyethylene particles used herein were prepared using HI-ZEX MILLION 240S (trade name; the average molecular weight of which is 2,000,000, and the average particle diameter of which is 120 μm) manufactured by Mitsui Chemicals, Inc., which was crosslinked by irradiation with electron rays. Thus, the ultrahigh molecular weight polyethylene particles which have undergone the crosslinking process contain crosslinked ultrahigh molecular weight polyethylene particles.

Each of the core rubber portion of the compressed rubber layer, the adhesive rubber layer, and the backface rubber layer was made of another rubber composition containing an EPDM as a rubber component. A cord was made of twist yarn of polyethylene terephthalate fibers. The belt had a length of 900 mm, a width of 10.68 mm, and a thickness of 4.3 mm, and included three ribs.

Comparative Example 1-1

A V-ribbed belt having a compressed rubber layer, a surface rubber layer of which was made of an uncrosslinked rubber composition obtained by a method similar to the method of Example 1-1 except that uncrosslinked particles were used as ultrahigh molecular weight polyethylene particles, was produced as Comparative Example 1-1.

TABLE 1

| | Example 1-1 | Comparative Example 1-1 |
|---|---|---|
| EPDM | 100 | 100 |
| Crosslinked PE Particles | 80 | |
| Uncrosslinked PE Particles | | 80 |
| Carbon Black | 2 | 2 |
| Silica | 40 | 40 |
| Calcium Carbonate | 5 | 5 |
| Layered Silicate (Bentonite) | 40 | 40 |
| Hollow Particles | 2.7 | 2.7 |
| Stearic Acid | 0.5 | 0.5 |
| Zinc Oxide | 5 | 5 |
| Organic Peroxide (Purity of 40% by mass) | 8 (3.2) | 8 (3.2) |
| Co-crosslinking Agent | 2 | 2 |
| Wear Speed (ppm/h) | 48 | 464 |

(Test Method)

Figure 26:
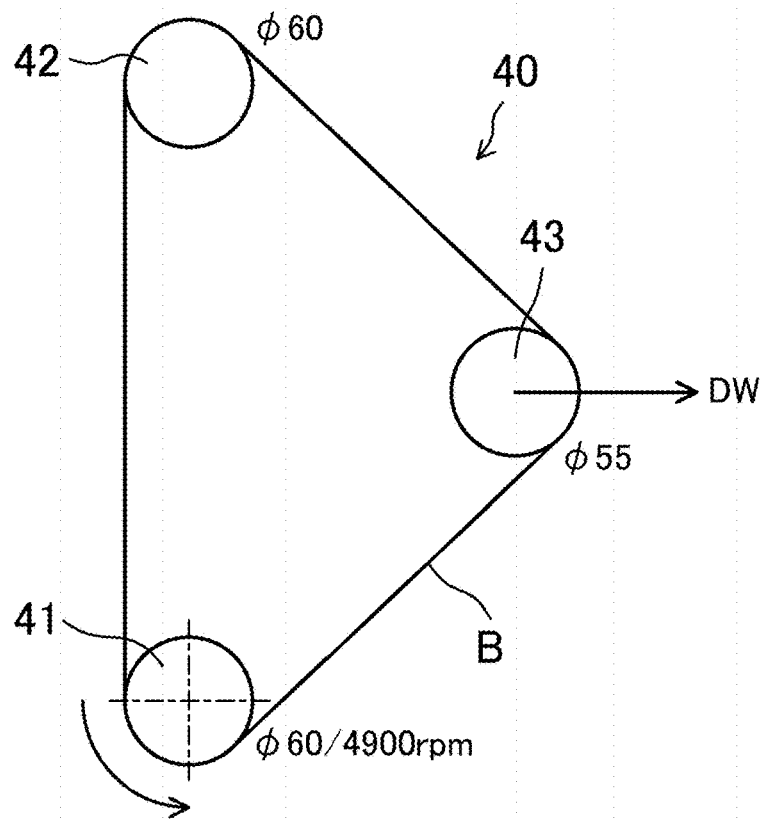
FIG. 26 illustrates a layout of pulleys of a belt running tester for evaluating wear resistance.

FIG. 26 illustrates a layout of pulleys of a belt running tester 40 for evaluating wear resistance.

The belt running tester 40 for evaluating wear resistance includes a drive pulley 41, which is a ribbed pulley, having a diameter of 60 mm, a first driven pulley 42, which is a ribbed pulley, having a diameter of 60 mm and provided above the drive pulley 41, and a second driven pulley 43, which is a ribbed pulley, having a diameter of 55 mm and provided at the right side of a midpoint between the pulleys 41 and 42 in the vertical direction. In order to accelerate wear, the surface roughness (Ra) of the drive pulley 41 and the first driven pulley 42 was set to be 2 μm±0.3 μm. The surface roughness (Ra) of the second driven pulley was set to be 0.3 μm.

After the initial mass of each of the V-ribbed belts B of the Example 1-1 and Comparative Example 1-1 was measured, the V-ribbed belt was wrapped around the belt running tester 40 for evaluating wear resistance such that the V-shaped ribs thereof were brought into contact with the drive pulley 41, the first driven pulley 42, and the second driven pulley 43. Rotation load of 2.62 kW was applied to the first driven pulley 42, and a dead weight DW of 157 N was laterally applied to the second driven pulley 43 so that a tensile force was applied to the V-ribbed belt. Under an atmosphere of room temperature, the drive pulley 41 was rotated at 4900 rpm to run the belt.

The running of the V-ribbed belt B of Example 1-1 was temporarily stopped at 19 hours, 44 hours, and 67 hours from the start of the belt running, when the belt was detached from the belt running tester 40 for evaluating wear resistance to measure the mass of the belt. The mass measured was subtracted from the initial mass of the belt, and the obtained mass of wear was divided by the initial mass of the belt to obtain a wear rate. In addition, the wear speed during a period from 44 to 67 hours of the belt running was obtained. The running of the V-ribbed belt B of Comparative Example 1-1 was temporarily stopped at 24 hours, 44 hours, and 70 hours from the start of the belt running, when the belt was detached from the belt running tester 40 for evaluating wear resistance to measure the mass of the belt. The mass measured was subtracted from the initial mass of the belt, and the obtained mass of wear was divided by the initial mass of the belt to obtain a wear rate. In addition, the wear speed during a period between 44 to 70 hours of the belt running was obtained.

(Test Results)

Figure 27:
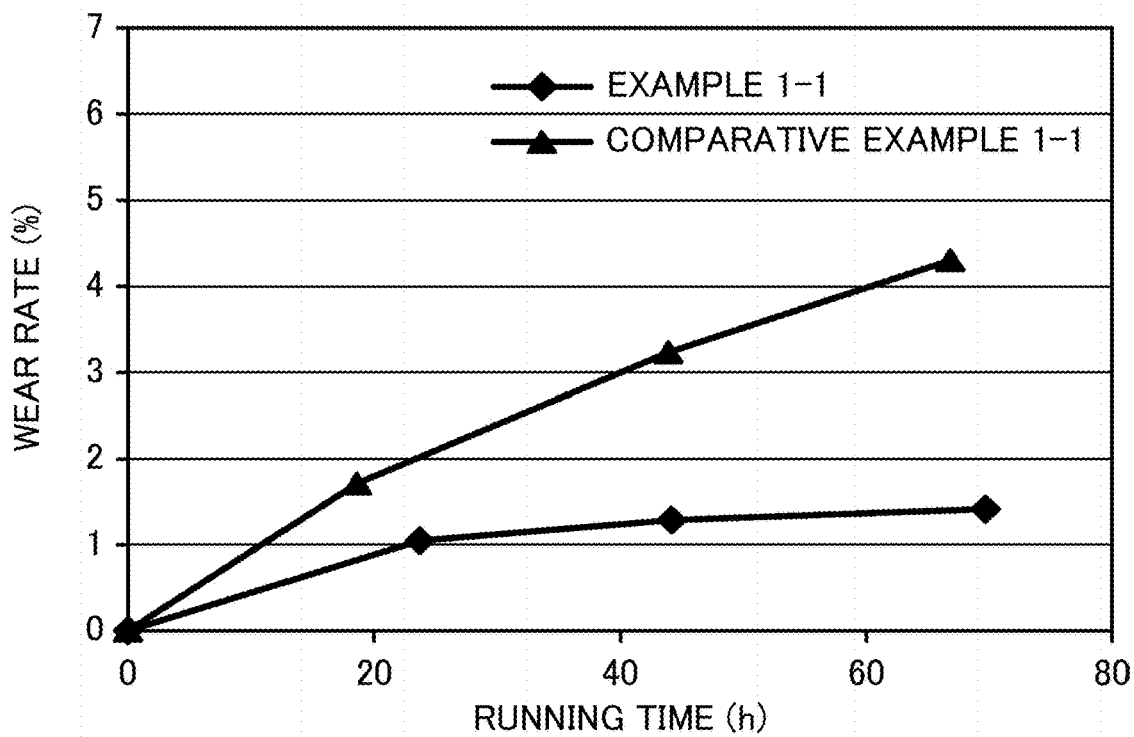
FIG. 27 is a graph showing a relationship between belt running time and wear rate.
Figure 28A:
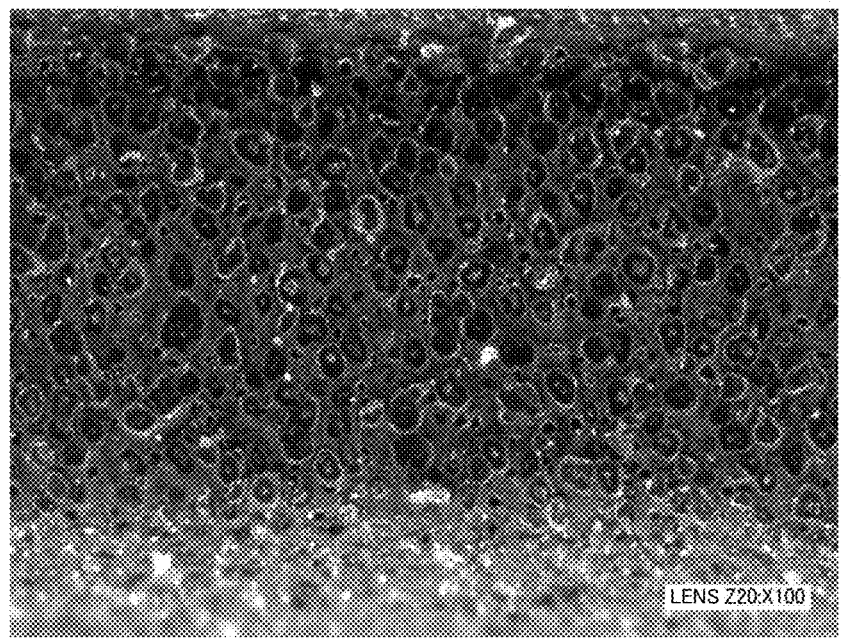
FIG. 28A is an observation picture taken by a scanning electron microscope, showing a surface state of a V-shaped rib after running of a V-ribbed belt of Example 1-1.
Figure 28B:
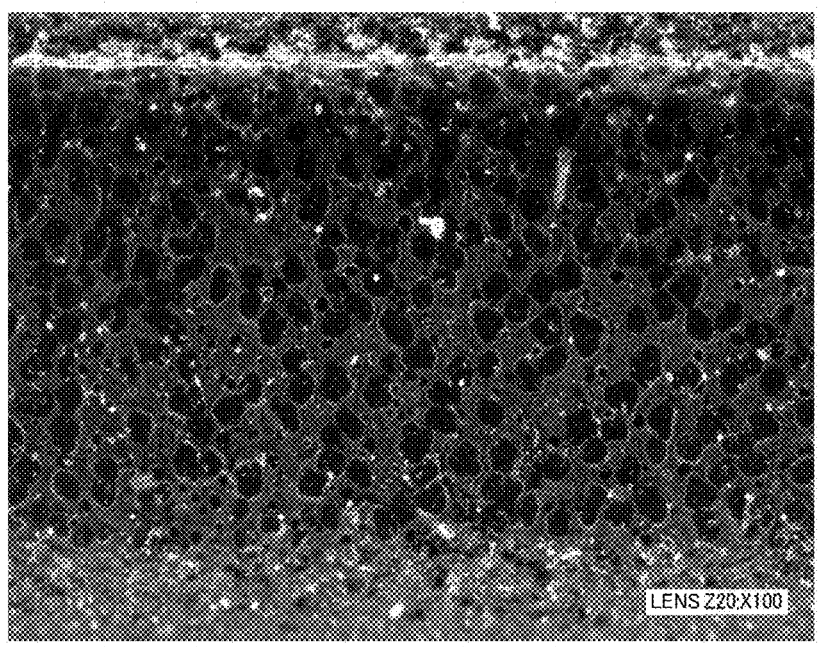
FIG. 28B is an observation picture taken by a scanning electron microscope, showing a surface state of a V-shaped rib after running of a V-ribbed belt of Comparative Example 1-1.

FIG. 27 shows a relationship between the belt running time and the wear rate with respect to the belts of Example 1-1 and Comparative Example 1-1. FIGS. 28A and 28B show surface states of the V-shaped ribs of the pulley contacting portions of the belts of Example 1-1 and Comparative Example 1-1, respectively, after the belt running.

FIG. 27 shows that the wear progress in Example 1-1 is slower than the wear progress in Comparative Example 1-1. Specifically, as shown in Table 1, the wear speed, which is a degree of increment of the wear rate per unit time during a period from 44 to 67 hours of the belt running, is 48 ppm/h in Example 1-1, whereas the wear speed during approximately the same period, that is, a period from 44 to 70 hours of the belt running, is 464 ppm/h in Comparative Example 1-1. That is, the wear speed of Example 1-1 is less than or equal to one ninth (i.e., 1/9) of the wear speed of the Comparative Example 1-1, which is, in other words, a wear resistance lifetime of Example 1-1 is nine times the wear resistance lifetime of the Comparative Example 1-1, showing a significant improvement in the wear resistance.

In both of Example 1-1 and Comparative Example 1-1, the state of the ultrahigh molecular weight polyethylene particles before mixture is such that spherical particles coagulate like clusters. However, FIGS. 28A and 28B show that the spherical particles are fused and integrated and hence formed into a spherical or ellipsoidal shape.

Example 2

(V-Ribbed Belt)

V-ribbed belts of the following Examples 2-1 to 2-3 and Comparative Examples 2-1 to 2-3 were prepared. The composition of each belt will also be shown in Table 2.

Example 2-1

An EPDM as a rubber component was placed in a chamber of an internal Banbury mixer and was masticated therein. Subsequently, with respect to 100 parts by mass of this rubber component, 2 parts by mass of ISAF carbon black, 80 parts by mass of crosslinked polyethylene hollow particles (1) obtained by irradiating, and thereby crosslinking, ultrahigh molecular weight polyethylene particles with electron rays, 40 parts by mass of silica, 40 parts by mass of layered silicate (bentonite), 5 parts by mass of calcium carbonate, 2.7 parts by mass of hollow particles, 0.5 parts by mass of stearic acid, 5 parts by mass of zinc oxide, 8 parts by mass (3.2 parts by mass) of an organic peroxide crosslinking agent, the purity of which is 40% by mass, and 2 parts by mass of a co-crosslinking agent were added thereto and kneaded. A V-ribbed belt having a configuration similar to that of the third embodiment, in which a surface rubber layer of the compressed rubber layer was made of the thus obtained uncrosslinked rubber composition, was produced as Example 2-1.

The crosslinked polyethylene hollow particles (1) used herein were prepared using HI-ZEX MILLION 240S (trade name; the average molecular weight of which is 2,000,000, and the average particle diameter of which is 120 µm) manufactured by Mitsui Chemicals, Inc., which was crosslinked by irradiation with electron rays at a dose of 200 kGy to form hollow portions therein.

Each of the core rubber portion of the compressed rubber layer, the adhesive rubber layer, and the backface rubber layer was made of another rubber composition containing an EPDM as a rubber component. A cord was made of twist yarn of polyethylene terephthalate fibers. The surface rubber layer of the compressed rubber layer was subjected to surface polishing. The belt had a length of 900 mm, a width of 21.36 mm, and a thickness of 4.3 mm, and included six ribs.

Example 2-2

A V-ribbed belt having the same configuration as that of the V-ribbed belt of Example 2-1 except that the crosslinked polyethylene hollow particles (1) were replaced with crosslinked polyethylene hollow particles (2) was produced as Example 2-2. The crosslinked polyethylene hollow particles (2) was prepared using SUNFINE UH-850 (trade name; the average molecular weight of which is 2,200,000, and the average particle diameter of which is 150 µm) manufactured by Asahi-Kasei Chemicals Corporation, which was crosslinked by irradiation with electron rays at a dose of 200 kGy to form hollow portions therein.

Example 2-3

A V-ribbed belt having the same configuration as that of the V-ribbed belt of Example 2-1 except that the ISAF carbon black was replaced with HAF carbon black and that no hollow particles were used, and a configuration similar to the configuration of the second embodiment, was produced as Example 2-3.

Comparative Example 2-1

The following V-ribbed belt was produced as Comparative Example 2-1 which had the same configuration as that of the V-ribbed belt of Example 2-1 except that, instead of the crosslinked polyethylene hollow particles (1), 50 parts by mass of HI-ZEX MILLION 240S (trade name) manufactured by Mitsui Chemicals, Inc., not crosslinked by the irradiation with electron rays (that is, uncrosslinked polyethylene solid particles) was used with respect to 100 parts by mass of the rubber component, and that 2.6 parts by mass of hollow particles with respect to 100 parts by mass of the rubber component and 7.3 parts by mass of the foaming agent with respect to 100 parts by mass of the rubber component were used.

Comparative Example 2-2

A V-ribbed belt having the same configuration as that of the V-ribbed belt of Comparative Example 2-1 except that 70 parts by mass of uncrosslinked polyethylene solid particles were used with respect to 100 parts by mass of the rubber component, and that no foaming agent was used, was produced as Comparative Example 2-2.

Comparative Example 2-3

A V-ribbed belt having the same configuration as that of the V-ribbed belt of Comparative Example 2-2 except that 100 parts by mass of uncrosslinked polyethylene solid particles were used with respect to 100 parts by mass of the rubber component, and that 3.1 parts by mass of hollow particles were used with respect to 100 parts by mass of the rubber component, was produced as Comparative Example 2-3.

TABLE 2

|  | Example | | | Comparative Example | | |
|---|---|---|---|---|---|---|
|  | 2-1 | 2-2 | 2-3 | 2-1 | 2-2 | 2-3 |
| EPDM | 100 | 100 | 100 | 100 | 100 | 100 |
| Crosslinked PE Hollow Particles (1) | 80 |  | 80 |  |  |  |
| Crosslinked PE Hollow Particles (2) |  | 80 |  |  |  |  |
| Uncrosslinked PE Solid Particles |  |  |  | 50 | 70 | 100 |
| ISAF Carbon Black | 2 | 2 |  | 2 | 2 | 2 |
| HAF Carbon Black |  |  | 2 |  |  |  |
| Silica | 40 | 40 | 40 | 40 | 40 | 40 |
| Layered Silicate (Bentonite) | 40 | 40 | 40 | 40 | 40 | 40 |
| Calcium Carbonate | 5 | 5 | 5 | 5 | 5 | 5 |
| Hollow Particles | 2.7 | 2.7 |  | 2.6 | 2.6 | 3.1 |
| Foaming Agent |  |  |  | 7.3 |  |  |
| Stearic Acid | 0.5 | 0.5 | 0.5 | 0.5 | 0.5 | 0.5 |
| Zinc Oxide | 5 | 5 | 5 | 5 | 5 | 5 |
| Organic Peroxide | 8 | 8 | 8 | 8 | 8 | 8 |
| (Purity of 40% by mass) | (3.2) | (3.2) | (3.2) | (3.2) | (3.2) | (3.2) |
| Co-crosslinking Agent | 2 | 2 | 2 | 2 | 2 | 2 |
| Whether Belt Stopped Running | No | No | No | Yes | Yes | Yes |

(Test Evaluation Method)

Figure 29:
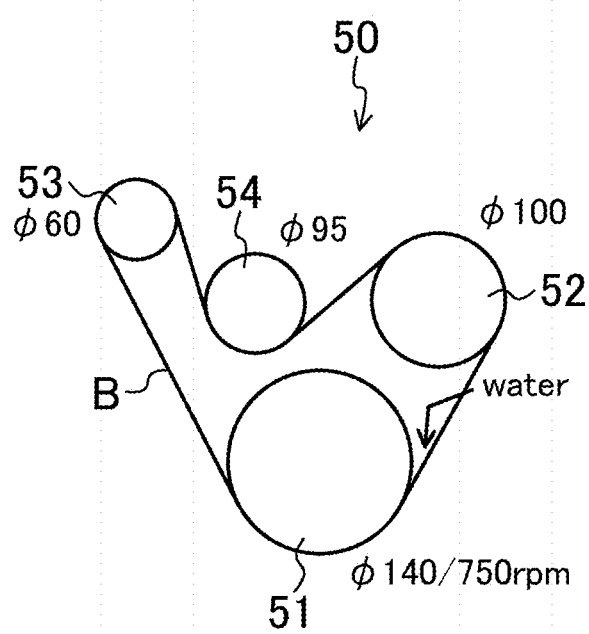
FIG. 29 illustrates a layout of pulleys of a belt running tester.

FIG. 29 illustrates a layout of pulleys of a belt running tester 50.

The belt running tester 50 includes: a zinc plated drive pulley 51, which is a ribbed pulley, having a diameter of 140 mm and provided at a lowermost position; a first driven pulley 52 (an air conditioning pulley), which is a ribbed pulley, having a diameter of 100 mm and provided at an upper right position of the drive pulley 51; and a second driven pulley 53 (an alternator pulley), which is a ribbed pulley, having a diameter of 60 mm and provided at an upper left position of the drive pulley 51 and the first driven pulley 52, and further includes an idler pulley 54, which is a flat pulley, having a diameter of 95 mm and provided on the left side of the first driven pulley 52. The belt running tester 50 is configured such that a V-ribbed belt B is wrapped around the respective pulleys so that the V-shaped ribs thereof come into contact with the drive pulley 51 and first and second driven pulleys 52 and 53, which are ribbed pulleys, and the backface thereof comes into contact with the idler pulley 54, which is a flat pulley.

Each of the V-ribbed belts B of Examples 2-1 to 2-3 and Comparative Examples 2-1 to 2-3 were wrapped around the respective pulleys of the belt running tester 50. The idler pulley 54 was positioned so that a tensile force of 400 N is applied to the belt. Loads were applied to the first and second driven pulleys 52 and 53 (i.e., 1.5 MPa to the first driven pulley 52, and 20A to the second driven pulley 53). The drive pulley 51 was rotated at 750±120 rpm under an ambient temperature of 25° C. to run the belt. Then, 10 ml water was dropped onto a portion of the belt from where the belt is wrapped around the drive pulley 51 to check whether or not the belt stopped running due to slips.

(Test Results)

Table 2 shows the test results. Table 2 shows that the belt did not stop running in Examples 2-1 to 2-3 in which crosslinked polyethylene hollow particles are dispersed and exposed on a surface of the pulley contacting portion, whereas the belt stopped running in Comparative Examples 2-1 to 2-3 in which uncrosslinked polyethylene solid particles are dispersed and exposed on a surface of the pulley contacting portion. Thus, the V-ribbed belts of Examples 2-1 to 2-3 in which crosslinked polyethylene hollow particles are dispersed and exposed on the surface of the pulley contacting portion exhibit a significant effect of reducing the decline in power transmission capability due to slips when the belt is wet.

Figure 30A:
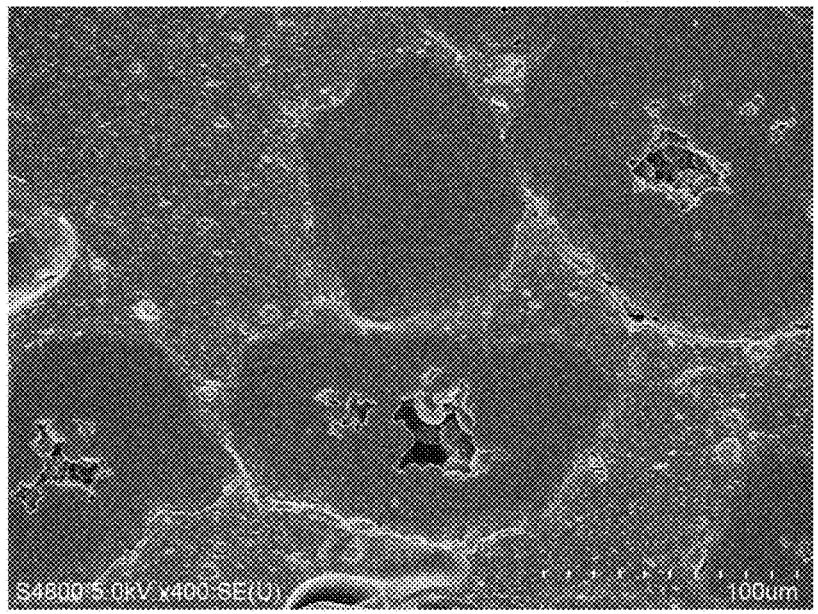
FIG. 30A is an observation picture taken by a scanning electron microscope, showing a surface state of a V-shaped rib after running of a V-ribbed belt of Example 2-2.
Figure 30B:
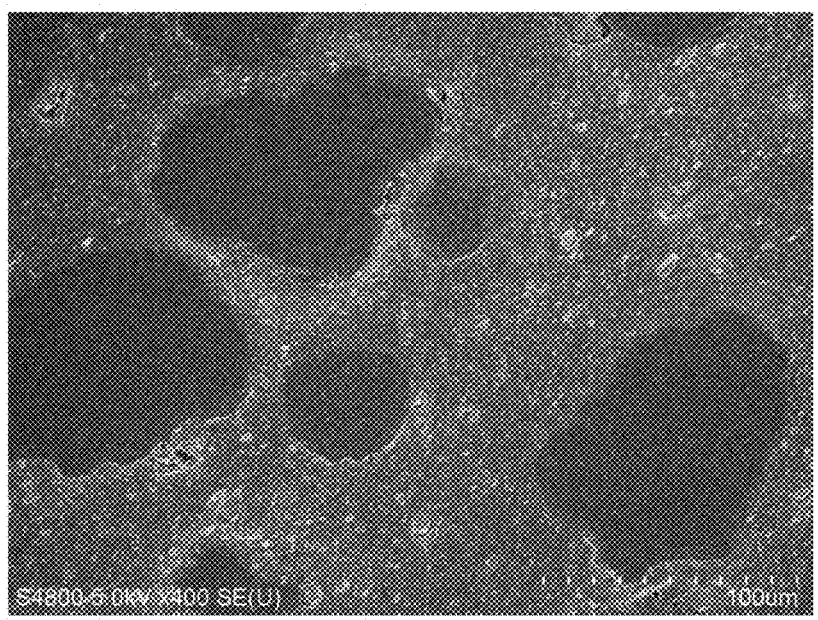
FIG. 30B is an observation picture taken by a scanning electron microscope, showing a surface state of a V-shaped rib after running of a V-ribbed belt of Comparative Example 2-3.

FIGS. 30A and 30B are observation pictures taken by a scanning electron microscope, showing surface states of the V-shaped ribs of the pulley contacting portions of the belts of Example 2-2 and Comparative Example 2-3, respectively, after the belt running.

According to FIGS. 30A and 30B, some particles exposed on the surface of the pulley contacting portion have hollow portions in Example 2-2, whereas no hollow portions are found in the particles exposed on the surface of the pulley contacting portion in Comparative Example 2-3. From these facts, the V-ribbed belt B of Examples 2-1 to 2-3 may have the drain effect caused by the hollow portions of the crosslinked polyolefin hollow particles exposed on the surface of the pulley contacting portion, and the driving effect caused by edges of the hollows portions engaging with the pulley.

The present invention is useful in the technical field of a friction transmission belt and a method for forming the friction transmission belt.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A friction transmission belt comprising a rubber layer forming a pulley contacting portion, wherein
the rubber layer is made by crosslinking an uncrosslinked rubber composition comprising an uncrosslinked rubber component and radiation-crosslinked polyolefin particles.

2. The friction transmission belt of claim 1, wherein
with the radiation-crosslinked polyolefin particles contain ultrahigh molecular weight polyolefin particles having an average molecular weight of 500,000 or more.

3. The friction transmission belt of claim 1, wherein
the radiation-crosslinked polyolefin particles contain crosslinked polyethylene particles.

4. The friction transmission belt of claim 1, wherein
a content of the radiation-crosslinked polyolefin particles in the uncrosslinked rubber composition is 20 parts by mass or more and 100 parts by mass or less with respect to 100 parts by mass of the uncrosslinked rubber component.

5. The friction transmission belt of claim 1, wherein
the uncrosslinked rubber composition further contains uncrosslinked polyolefin particles.

6. The friction transmission belt of claim 1, further comprising
a core rubber portion covered with the rubber layer.

7. The friction transmission belt of claim 6, wherein
the core rubber portion is made of a rubber composition in which a content of the radiation-crosslinked polyolefin particles with respect to 100 parts by mass of a rubber component is smaller than the content of the radiation-crosslinked polyolefin particles with respect to 100 parts by mass of the uncrosslinked rubber component of the rubber layer, or a rubber composition not containing the radiation-crosslinked polyolefin particles.

8. The friction transmission belt of claim 1, wherein the rubber layer is made of a porous rubber.

9. A method for forming the friction transmission belt according to claim 1 comprising heating and pressing an uncrosslinked rubber composition prepared by mixing an uncrosslinked rubber component and radiation-crosslinked polyolefin particles, and thereby crosslinking the uncrosslinked rubber composition.

10. The method of claim 9, wherein
the radiation-crosslinked polyolefin particles are prepared by irradiating uncrosslinked polyolefin particles with radiation.

11. The method of claim 9, wherein the radiation-crosslinked polyolefin particles are formed into clusters, further comprising fusing and integrating the clusters by the heating into a spherical or ellipsoidal shape.

12. A friction transmission belt comprising a rubber layer forming a pulley contacting portion, wherein
the rubber layer is made of a rubber composition containing a crosslinked rubber component and crosslinked polyolefin particles, and
the crosslinked polyolefin particles contain crosslinked polyolefin hollow particles having hollow portions.

13. A friction transmission belt comprising a rubber layer forming a pulley contacting portion, wherein
the rubber layer is made of a rubber composition containing a crosslinked rubber component and crosslinked polyolefin particles prepared by irradiating uncrosslinked polyolefin particles with radiation.

* * * * *